(12) United States Patent
Zhang et al.

(10) Patent No.: US 8,988,825 B1
(45) Date of Patent: Mar. 24, 2015

(54) METHOD FOR FABRICATING A MAGNETIC WRITER HAVING HALF-SIDE SHIELDS

(71) Applicant: Western Digital (Fremont), LLC, Fremont, CA (US)

(72) Inventors: Jinqiu Zhang, Fremont, CA (US); Lien-Chang Wang, Fremont, CA (US); Xiaoyu Yang, Union City, CA (US); Feng Liu, San Ramon, CA (US); Ming Jiang, San Jose, CA (US)

(73) Assignee: Western Digital (Fremont, LLC, Fremont, CA (US)

( * ) Notice: Subject to any disclaimer, the term of this patent is extended or adjusted under 35 U.S.C. 154(b) by 0 days.

(21) Appl. No.: 14/279,608

(22) Filed: May 16, 2014

Related U.S. Application Data

(60) Provisional application No. 61/946,564, filed on Feb. 28, 2014.

(51) Int. Cl.
*G11B 5/147* (2006.01)
*G11B 5/31* (2006.01)
*G11B 5/11* (2006.01)

(52) U.S. Cl.
CPC ............... *G11B 5/3163* (2013.01); *G11B 5/11* (2013.01)
USPC ....................................... 360/125.3

(58) Field of Classification Search
USPC ............... 360/125.3, 125.32, 125.03, 125.11, 360/125.15; 29/603.12, 603.13, 603.15, 29/603.16
See application file for complete search history.

(56) References Cited

U.S. PATENT DOCUMENTS

| | | |
|---|---|---|
| 5,801,910 A | 9/1998 | Mallary |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |

(Continued)

OTHER PUBLICATIONS

Feng Liu, et al., U.S. Appl. No. 13/631,808, filed Sep. 28, 2012, 17 pages.

(Continued)

*Primary Examiner* — Allen T Cao

(57) ABSTRACT

A method and system provide a magnetic transducer having an air-bearing surface (ABS) location. An intermediate is provided. The intermediate layer includes a first sublayer and a second sublayer in at least a side shield region. The first sublayer has a first sublayer top. The second sublayer is on the first sublayer top in the shield region. A trench is formed in the intermediate layer using at least one etch. A main pole is provided in the trench. The main pole has a bottom and a top wider than the bottom. The first sublayer top is between the top and the bottom of the main pole. At least a portion of the second sublayer is removed in the shield region. At least one half side shield is provided. A bottom of the at least one half side shield being between the top and the bottom of the main pole.

18 Claims, 18 Drawing Sheets

(56) References Cited

U.S. PATENT DOCUMENTS

| | | | |
|---|---|---|---|
| 6,094,803 | A | 8/2000 | Carlson et al. |
| 6,099,362 | A | 8/2000 | Viches et al. |
| 6,103,073 | A | 8/2000 | Thayamballi |
| 6,108,166 | A | 8/2000 | Lederman |
| 6,118,629 | A | 9/2000 | Huai et al. |
| 6,118,638 | A | 9/2000 | Knapp et al. |
| 6,125,018 | A | 9/2000 | Takagishi et al. |
| 6,130,779 | A | 10/2000 | Carlson et al. |
| 6,134,089 | A | 10/2000 | Barr et al. |
| 6,136,166 | A | 10/2000 | Shen et al. |
| 6,137,661 | A | 10/2000 | Shi et al. |
| 6,137,662 | A | 10/2000 | Huai et al. |
| 6,160,684 | A | 12/2000 | Heist et al. |
| 6,163,426 | A | 12/2000 | Nepela et al. |
| 6,166,891 | A | 12/2000 | Lederman et al. |
| 6,172,848 | B1 | 1/2001 | Santini |
| 6,173,486 | B1 | 1/2001 | Hsiao et al. |
| 6,175,476 | B1 | 1/2001 | Huai et al. |
| 6,178,066 | B1 | 1/2001 | Barr |
| 6,178,070 | B1 | 1/2001 | Hong et al. |
| 6,178,150 | B1 | 1/2001 | Davis |
| 6,181,485 | B1 | 1/2001 | He |
| 6,181,525 | B1 | 1/2001 | Carlson |
| 6,185,051 | B1 | 2/2001 | Chen et al. |
| 6,185,077 | B1 | 2/2001 | Tong et al. |
| 6,185,081 | B1 | 2/2001 | Simion et al. |
| 6,188,549 | B1 | 2/2001 | Wiitala |
| 6,190,764 | B1 | 2/2001 | Shi et al. |
| 6,193,584 | B1 | 2/2001 | Rudy et al. |
| 6,195,229 | B1 | 2/2001 | Shen et al. |
| 6,198,608 | B1 | 3/2001 | Hong et al. |
| 6,198,609 | B1 | 3/2001 | Barr et al. |
| 6,201,673 | B1 | 3/2001 | Rottmayer et al. |
| 6,204,998 | B1 | 3/2001 | Katz |
| 6,204,999 | B1 | 3/2001 | Crue et al. |
| 6,212,153 | B1 | 4/2001 | Chen et al. |
| 6,215,625 | B1 | 4/2001 | Carlson |
| 6,219,205 | B1 | 4/2001 | Yuan et al. |
| 6,221,218 | B1 | 4/2001 | Shi et al. |
| 6,222,707 | B1 | 4/2001 | Huai et al. |
| 6,229,782 | B1 | 5/2001 | Wang et al. |
| 6,230,959 | B1 | 5/2001 | Heist et al. |
| 6,233,116 | B1 | 5/2001 | Chen et al. |
| 6,233,125 | B1 | 5/2001 | Knapp et al. |
| 6,237,215 | B1 | 5/2001 | Hunsaker et al. |
| 6,252,743 | B1 | 6/2001 | Bozorgi |
| 6,255,721 | B1 | 7/2001 | Roberts |
| 6,258,468 | B1 | 7/2001 | Mahvan et al. |
| 6,266,216 | B1 | 7/2001 | Hikami et al. |
| 6,271,604 | B1 | 8/2001 | Frank, Jr. et al. |
| 6,275,354 | B1 | 8/2001 | Huai et al. |
| 6,277,505 | B1 | 8/2001 | Shi et al. |
| 6,282,056 | B1 | 8/2001 | Feng et al. |
| 6,296,955 | B1 | 10/2001 | Hossain et al. |
| 6,297,955 | B1 | 10/2001 | Frank, Jr. et al. |
| 6,304,414 | B1 | 10/2001 | Crue, Jr. et al. |
| 6,307,715 | B1 | 10/2001 | Berding et al. |
| 6,310,746 | B1 | 10/2001 | Hawwa et al. |
| 6,310,750 | B1 | 10/2001 | Hawwa et al. |
| 6,317,290 | B1 | 11/2001 | Wang et al. |
| 6,317,297 | B1 | 11/2001 | Tong et al. |
| 6,322,911 | B1 | 11/2001 | Fukagawa et al. |
| 6,330,136 | B1 | 12/2001 | Wang et al. |
| 6,330,137 | B1 | 12/2001 | Knapp et al. |
| 6,333,830 | B2 | 12/2001 | Rose et al. |
| 6,340,533 | B1 | 1/2002 | Ueno et al. |
| 6,349,014 | B1 | 2/2002 | Crue, Jr. et al. |
| 6,351,355 | B1 | 2/2002 | Min et al. |
| 6,353,318 | B1 | 3/2002 | Sin et al. |
| 6,353,511 | B1 | 3/2002 | Shi et al. |
| 6,356,412 | B1 | 3/2002 | Levi et al. |
| 6,359,779 | B1 | 3/2002 | Frank, Jr. et al. |
| 6,369,983 | B1 | 4/2002 | Hong |
| 6,376,964 | B1 | 4/2002 | Young et al. |
| 6,377,535 | B1 | 4/2002 | Chen et al. |
| 6,381,095 | B1 | 4/2002 | Sin et al. |
| 6,381,105 | B1 | 4/2002 | Huai et al. |
| 6,389,499 | B1 | 5/2002 | Frank, Jr. et al. |
| 6,392,850 | B1 | 5/2002 | Tong et al. |
| 6,396,660 | B1 | 5/2002 | Jensen et al. |
| 6,399,179 | B1 | 6/2002 | Hanrahan et al. |
| 6,400,526 | B2 | 6/2002 | Crue, Jr. et al. |
| 6,404,600 | B1 | 6/2002 | Hawwa et al. |
| 6,404,601 | B1 | 6/2002 | Rottmayer et al. |
| 6,404,706 | B1 | 6/2002 | Stovall et al. |
| 6,410,170 | B1 | 6/2002 | Chen et al. |
| 6,411,522 | B1 | 6/2002 | Frank, Jr. et al. |
| 6,417,998 | B1 | 7/2002 | Crue, Jr. et al. |
| 6,417,999 | B1 | 7/2002 | Knapp et al. |
| 6,418,000 | B1 | 7/2002 | Gibbons et al. |
| 6,418,048 | B1 | 7/2002 | Sin et al. |
| 6,421,211 | B1 | 7/2002 | Hawwa et al. |
| 6,421,212 | B1 | 7/2002 | Gibbons et al. |
| 6,424,505 | B1 | 7/2002 | Lam et al. |
| 6,424,507 | B1 | 7/2002 | Lederman et al. |
| 6,430,009 | B1 | 8/2002 | Komaki et al. |
| 6,430,806 | B1 | 8/2002 | Chen et al. |
| 6,433,965 | B1 | 8/2002 | Gopinathan et al. |
| 6,433,968 | B1 | 8/2002 | Shi et al. |
| 6,433,970 | B1 | 8/2002 | Knapp et al. |
| 6,437,945 | B1 | 8/2002 | Hawwa et al. |
| 6,445,536 | B1 | 9/2002 | Rudy et al. |
| 6,445,542 | B1 | 9/2002 | Levi et al. |
| 6,445,553 | B2 | 9/2002 | Barr et al. |
| 6,445,554 | B1 | 9/2002 | Dong et al. |
| 6,447,935 | B1 | 9/2002 | Zhang et al. |
| 6,448,765 | B1 | 9/2002 | Chen et al. |
| 6,451,514 | B1 | 9/2002 | Iitsuka |
| 6,452,742 | B1 | 9/2002 | Crue et al. |
| 6,452,765 | B1 | 9/2002 | Mahvan et al. |
| 6,456,465 | B1 | 9/2002 | Louis et al. |
| 6,459,552 | B1 | 10/2002 | Liu et al. |
| 6,462,920 | B1 | 10/2002 | Karimi |
| 6,466,401 | B1 | 10/2002 | Hong et al. |
| 6,466,402 | B1 | 10/2002 | Crue, Jr. et al. |
| 6,466,404 | B1 | 10/2002 | Crue, Jr. et al. |
| 6,468,436 | B1 | 10/2002 | Shi et al. |
| 6,469,877 | B1 | 10/2002 | Knapp et al. |
| 6,477,019 | B2 | 11/2002 | Matono et al. |
| 6,479,096 | B1 | 11/2002 | Shi et al. |
| 6,483,662 | B1 | 11/2002 | Thomas et al. |
| 6,487,040 | B1 | 11/2002 | Hsiao et al. |
| 6,487,056 | B1 | 11/2002 | Gibbons et al. |
| 6,490,125 | B1 | 12/2002 | Barr |
| 6,496,330 | B1 | 12/2002 | Crue, Jr. et al. |
| 6,496,334 | B1 | 12/2002 | Pang et al. |
| 6,504,675 | B1 | 1/2003 | Shukh et al. |
| 6,504,676 | B1 | 1/2003 | Hiner et al. |
| 6,512,657 | B2 | 1/2003 | Heist et al. |
| 6,512,659 | B1 | 1/2003 | Hawwa et al. |
| 6,512,661 | B1 | 1/2003 | Louis |
| 6,512,690 | B1 | 1/2003 | Qi et al. |
| 6,515,573 | B1 | 2/2003 | Dong et al. |
| 6,515,791 | B1 | 2/2003 | Hawwa et al. |
| 6,532,823 | B1 | 3/2003 | Knapp et al. |
| 6,535,363 | B1 | 3/2003 | Hosomi et al. |
| 6,552,874 | B1 | 4/2003 | Chen et al. |
| 6,552,928 | B1 | 4/2003 | Qi et al. |
| 6,577,470 | B1 | 6/2003 | Rumpler |
| 6,583,961 | B2 | 6/2003 | Levi et al. |
| 6,583,968 | B1 | 6/2003 | Scura et al. |
| 6,597,548 | B1 | 7/2003 | Yamanaka et al. |
| 6,611,398 | B1 | 8/2003 | Rumpler et al. |
| 6,618,223 | B1 | 9/2003 | Chen et al. |
| 6,629,357 | B1 | 10/2003 | Akoh |
| 6,633,464 | B2 | 10/2003 | Lai et al. |
| 6,636,394 | B1 | 10/2003 | Fukagawa et al. |
| 6,639,291 | B1 | 10/2003 | Sin et al. |
| 6,650,503 | B1 | 11/2003 | Chen et al. |
| 6,650,506 | B1 | 11/2003 | Risse |
| 6,654,195 | B1 | 11/2003 | Frank, Jr. et al. |
| 6,657,816 | B1 | 12/2003 | Barr et al. |
| 6,661,621 | B1 | 12/2003 | Iitsuka |
| 6,661,625 | B1 | 12/2003 | Sin et al. |

(56) References Cited

U.S. PATENT DOCUMENTS

| | | |
|---|---|---|
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,710,973 B2 | 3/2004 | Okada et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,722,018 B2 | 4/2004 | Santini |
| 6,724,569 B1 | 4/2004 | Chen et al. |
| 6,724,572 B1 | 4/2004 | Stoev et al. |
| 6,729,015 B2 | 5/2004 | Matono et al. |
| 6,731,460 B2 | 5/2004 | Sasaki |
| 6,735,850 B1 | 5/2004 | Gibbons et al. |
| 6,737,281 B1 | 5/2004 | Dang et al. |
| 6,738,223 B2 | 5/2004 | Sato et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,762,911 B2 | 7/2004 | Sasaki et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,813,116 B2 | 11/2004 | Nakamura et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,857,181 B2 | 2/2005 | Lo et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,697 B2 | 5/2005 | Nakamura et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,903,900 B2 | 6/2005 | Sato et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,255 B2 | 9/2005 | Hsiao et al. |
| 6,947,258 B1 | 9/2005 | Li |
| 6,950,266 B1 | 9/2005 | McCaslin et al. |
| 6,950,277 B1 | 9/2005 | Nguy et al. |
| 6,952,325 B2 | 10/2005 | Sato et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 6,995,949 B2 | 2/2006 | Nakamura et al. |
| 7,006,326 B2 | 2/2006 | Okada et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,070,698 B2 | 7/2006 | Le |
| 7,092,195 B1 | 8/2006 | Liu et al. |
| 7,100,266 B2 | 9/2006 | Plumer et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,252 B2 | 11/2006 | Takano et al. |
| 7,133,253 B1 | 11/2006 | Seagle et al. |
| 7,134,185 B1 | 11/2006 | Knapp et al. |
| 7,139,153 B2 | 11/2006 | Hsiao et al. |
| 7,154,715 B2 | 12/2006 | Yamanaka et al. |
| 7,159,302 B2 | 1/2007 | Feldbaum et al. |
| 7,170,725 B1 | 1/2007 | Zhou et al. |
| 7,177,117 B1 | 2/2007 | Jiang et al. |
| 7,185,415 B2 | 3/2007 | Khera et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,206,166 B2 | 4/2007 | Notsuke et al. |
| 7,211,339 B1 | 5/2007 | Seagle et al. |
| 7,212,379 B2 | 5/2007 | Hsu et al. |
| 7,212,384 B1 | 5/2007 | Stoev et al. |
| 7,238,292 B1 | 7/2007 | He et al. |
| 7,239,478 B1 | 7/2007 | Sin et al. |
| 7,245,454 B2 | 7/2007 | Aoki et al. |
| 7,248,431 B1 | 7/2007 | Liu et al. |
| 7,248,433 B1 | 7/2007 | Stoev et al. |
| 7,248,449 B1 | 7/2007 | Seagle |
| 7,251,878 B2 | 8/2007 | Le et al. |
| 7,253,992 B2 | 8/2007 | Chen et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,338 B2 | 11/2007 | Le et al. |
| 7,296,339 B1 | 11/2007 | Yang et al. |

(56) References Cited

U.S. PATENT DOCUMENTS

| | | |
|---|---|---|
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,324,304 B1 | 1/2008 | Benakli et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,369,359 B2 | 5/2008 | Fujita et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,392,577 B2 | 7/2008 | Yazawa et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,095 B2 | 9/2008 | Benakli et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,441,325 B2 | 10/2008 | Gao et al. |
| 7,443,632 B1 | 10/2008 | Stoev et al. |
| 7,444,740 B1 | 11/2008 | Chung et al. |
| 7,464,457 B2 | 12/2008 | Le et al. |
| 7,469,467 B2 | 12/2008 | Gao et al. |
| 7,493,688 B1 | 2/2009 | Wang et al. |
| 7,508,627 B1 | 3/2009 | Zhang et al. |
| 7,508,628 B2 | 3/2009 | Che et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,535,675 B2 | 5/2009 | Kimura et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,558,019 B2 | 7/2009 | Le et al. |
| 7,580,222 B2 | 8/2009 | Sasaki et al. |
| 7,583,466 B2 | 9/2009 | Kermiche et al. |
| 7,595,967 B1 | 9/2009 | Moon et al. |
| 7,639,451 B2 | 12/2009 | Yatsu et al. |
| 7,639,452 B2 | 12/2009 | Mochizuki et al. |
| 7,639,457 B1 | 12/2009 | Chen et al. |
| 7,643,246 B2 | 1/2010 | Yazawa et al. |
| 7,660,080 B1 | 2/2010 | Liu et al. |
| 7,663,839 B2 | 2/2010 | Sasaki et al. |
| 7,672,079 B2 | 3/2010 | Li et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,748,104 B2 | 7/2010 | Bonhote et al. |
| 7,764,469 B2 | 7/2010 | Ho et al. |
| 7,785,666 B1 | 8/2010 | Sun et al. |
| 7,796,356 B1 | 9/2010 | Fowler et al. |
| 7,796,360 B2 | 9/2010 | Im et al. |
| 7,796,361 B2 | 9/2010 | Sasaki et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,841,068 B2 | 11/2010 | Chen et al. |
| 7,846,643 B1 | 12/2010 | Sun et al. |
| 7,855,854 B2 | 12/2010 | Hu et al. |
| 7,859,791 B2 | 12/2010 | Toma et al. |
| 7,869,160 B1 | 1/2011 | Pan et al. |
| 7,872,824 B1 | 1/2011 | Macchioni et al. |
| 7,872,833 B1 | 1/2011 | Hu et al. |
| 7,881,019 B2 | 2/2011 | Hsiao et al. |
| 7,898,773 B2 | 3/2011 | Han et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,425 B2 | 3/2011 | Sasaki et al. |
| 7,916,426 B2 | 3/2011 | Hu et al. |
| 7,918,013 B1 | 4/2011 | Dunn et al. |
| 7,921,544 B2 | 4/2011 | Sasaki et al. |
| 7,924,528 B2 | 4/2011 | Sasaki et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,027,125 B2 | 9/2011 | Lee et al. |
| 8,054,586 B2 | 11/2011 | Balamane et al. |
| 8,066,892 B2 | 11/2011 | Guthrie et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,033 B2 | 2/2012 | Kameda et al. |
| 8,116,043 B2 | 2/2012 | Leng et al. |
| 8,116,171 B1 | 2/2012 | Lee |
| 8,117,738 B2 | 2/2012 | Han et al. |
| 8,125,732 B2 | 2/2012 | Bai et al. |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,169,741 B2 | 5/2012 | Taguchi et al. |
| 8,171,618 B1 | 5/2012 | Wang et al. |
| 8,179,636 B1 | 5/2012 | Bai et al. |
| 8,184,399 B2 | 5/2012 | Wu et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,233 B1 | 7/2012 | Shen et al. |

(56) References Cited

U.S. PATENT DOCUMENTS

| | | | |
|---|---|---|---|
| 8,233,234 B2 | 7/2012 | Hsiao et al. |
| 8,233,235 B2 | 7/2012 | Chen et al. |
| 8,233,248 B1 | 7/2012 | Li et al. |
| 8,248,728 B2 | 8/2012 | Yamaguchi et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,792 B2 | 9/2012 | Bai et al. |
| 8,264,797 B2 | 9/2012 | Emley |
| 8,264,798 B1 | 9/2012 | Guan et al. |
| 8,270,109 B2 | 9/2012 | Ohtsu |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,649 B2 | 10/2012 | Sasaki et al. |
| 8,289,821 B1 | 10/2012 | Huber |
| 8,291,743 B1 | 10/2012 | Shi et al. |
| 8,305,711 B2 | 11/2012 | Li et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,347,488 B2 | 1/2013 | Hong et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,477,453 B2 * | 7/2013 | Takano et al. ............ 360/125.14 |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,687 B2 | 7/2013 | Sasaki et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,080 B2 | 7/2013 | Sasaki et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,235 B2 * | 1/2014 | Takano et al. ............ 360/125.15 |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |

(56) References Cited

U.S. PATENT DOCUMENTS

| | | |
|---|---|---|
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2003/0076630 A1 | 4/2003 | Sato et al. |
| 2004/0061988 A1 | 4/2004 | Matono et al. |
| 2004/0184191 A1 | 9/2004 | Ichihara et al. |
| 2005/0117251 A1 | 6/2005 | Matono et al. |
| 2005/0162778 A1 | 7/2005 | Kimura et al. |
| 2006/0044677 A1 | 3/2006 | Li et al. |
| 2006/0158779 A1 | 7/2006 | Ota et al. |
| 2006/0174474 A1 | 8/2006 | Le |
| 2006/0225268 A1 | 10/2006 | Le et al. |
| 2006/0288565 A1 | 12/2006 | Le et al. |
| 2007/0211380 A1 | 9/2007 | Akimoto et al. |
| 2007/0236834 A1 | 10/2007 | Toma et al. |
| 2007/0247746 A1 | 10/2007 | Kim et al. |
| 2007/0258167 A1 | 11/2007 | Allen et al. |
| 2007/0263324 A1 | 11/2007 | Allen et al. |
| 2007/0283557 A1 | 12/2007 | Chen et al. |
| 2008/0002309 A1 | 1/2008 | Hsu et al. |
| 2008/0151437 A1 | 6/2008 | Chen et al. |
| 2008/0232001 A1 | 9/2008 | Bonhote et al. |
| 2008/0273276 A1 | 11/2008 | Guan |
| 2008/0273277 A1 | 11/2008 | Guan et al. |
| 2009/0091861 A1* | 4/2009 | Takano et al. ............. 360/319 |
| 2009/0279206 A1 | 11/2009 | Yang et al. |
| 2010/0112486 A1 | 5/2010 | Zhang et al. |
| 2010/0146773 A1 | 6/2010 | Li et al. |
| 2010/0165517 A1 | 7/2010 | Araki et al. |
| 2010/0277832 A1 | 11/2010 | Bai et al. |
| 2010/0290157 A1 | 11/2010 | Zhang et al. |
| 2011/0051293 A1 | 3/2011 | Bai et al. |
| 2011/0086240 A1 | 4/2011 | Xiang et al. |
| 2011/0146060 A1 | 6/2011 | Han et al. |
| 2011/0151279 A1 | 6/2011 | Allen et al. |
| 2011/0205671 A1 | 8/2011 | Benakli et al. |
| 2011/0222188 A1 | 9/2011 | Etoh et al. |
| 2011/0273800 A1* | 11/2011 | Takano et al. ............. 360/125.12 |
| 2012/0111826 A1 | 5/2012 | Chen et al. |
| 2012/0162811 A1 | 6/2012 | Ishibashi et al. |
| 2012/0216378 A1 | 8/2012 | Emley et al. |
| 2012/0237878 A1 | 9/2012 | Zeng et al. |
| 2012/0268845 A1 | 10/2012 | Sahoo et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0286508 A1* | 10/2013 | Takano et al. ............. 360/125.14 |
| 2014/0154529 A1 | 6/2014 | Yang et al. |
| 2014/0175050 A1 | 6/2014 | Zhang et al. |
| 2014/0252518 A1* | 9/2014 | Zhang et al. ............. 257/422 |

OTHER PUBLICATIONS

Jinquiu Zhang, et. al., U.S. Appl. No. 14/280,342, filed May 16, 2014, 38 pages.

Jinquiu Zhang, et. al., U.S. Appl. No. 14/229,297, filed Mar. 28, 2014, 30 pages.

Mallary, et al., "One Terabit per Square Inch Perpendicular Recording Conceptual Design", IEEE Transactions on Magnetics, vol. 38, No. 4, Jul. 2002, pp. 1719-1724.

* cited by examiner

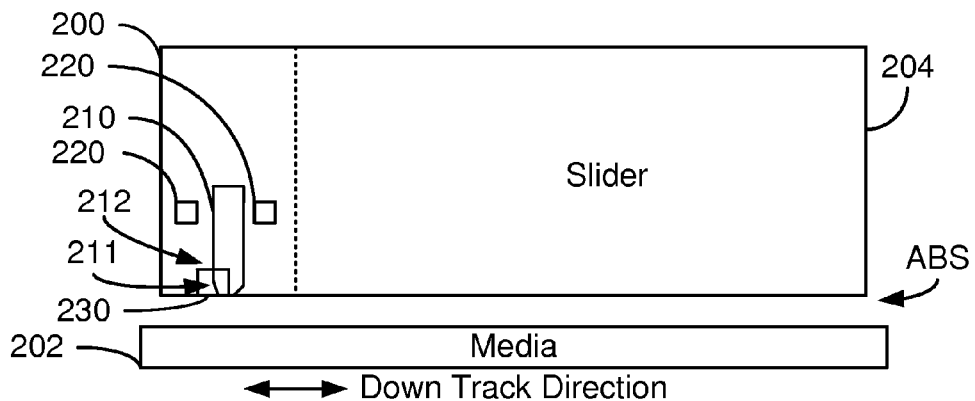
FIG. 3A
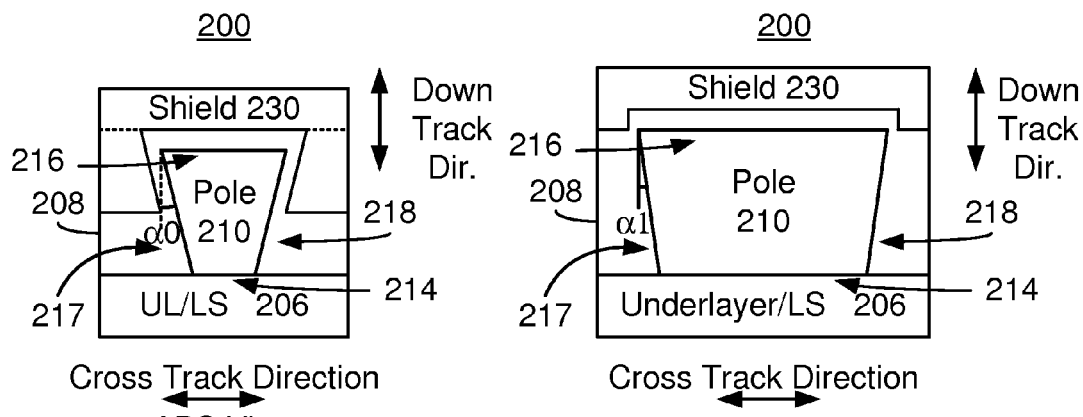
FIG. 3B
FIG. 3C
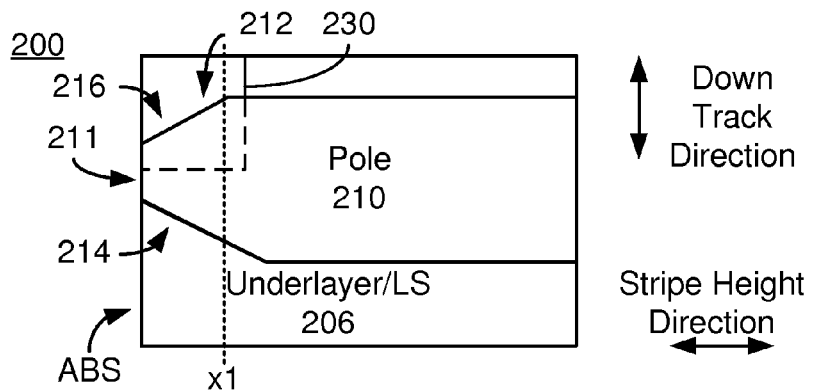
FIG. 3D

Side View

ABS View

Plan View

Side View

ABS View

Plan View

Side View

ABS View

Plan View

Side View

ABS View

Plan View

Side View

ABS View

Plan View

Side View

ABS View

Plan View

Side View

ABS View

Plan View

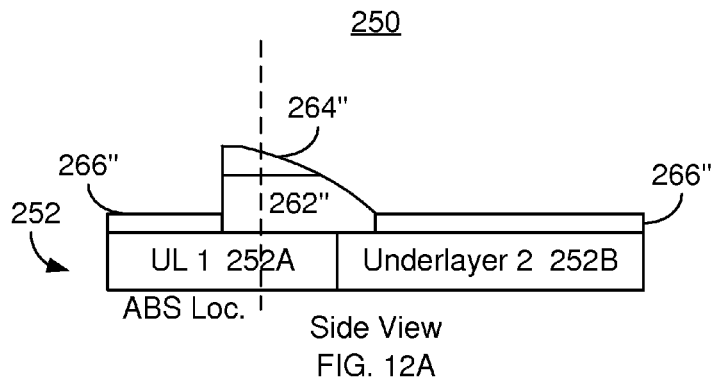
Side View
FIG. 12A
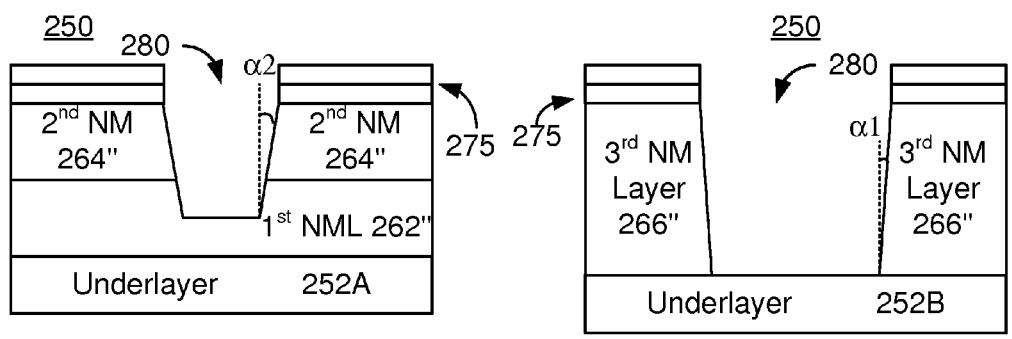
ABS View
FIG. 12B
Recessed View
FIG. 12C
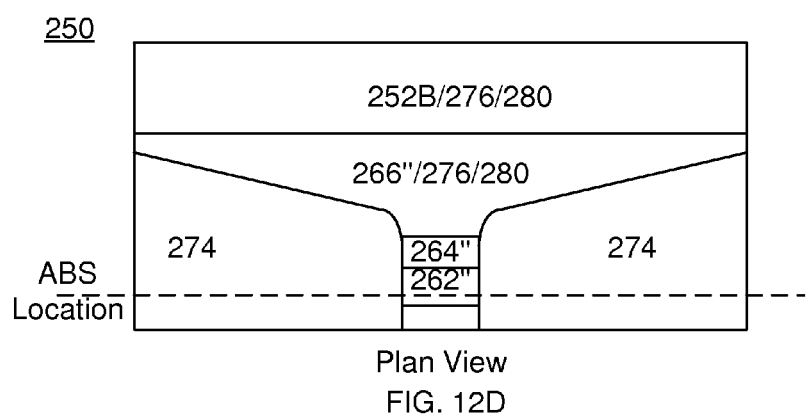
Plan View
FIG. 12D Side View ABS View Recessed View Plan View

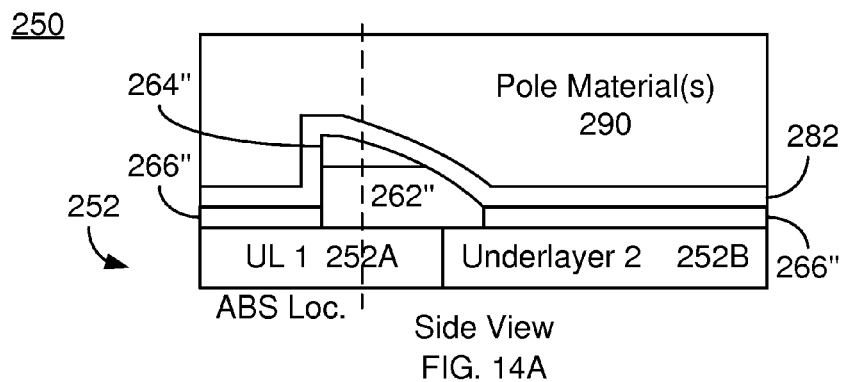
Side View
FIG. 14A
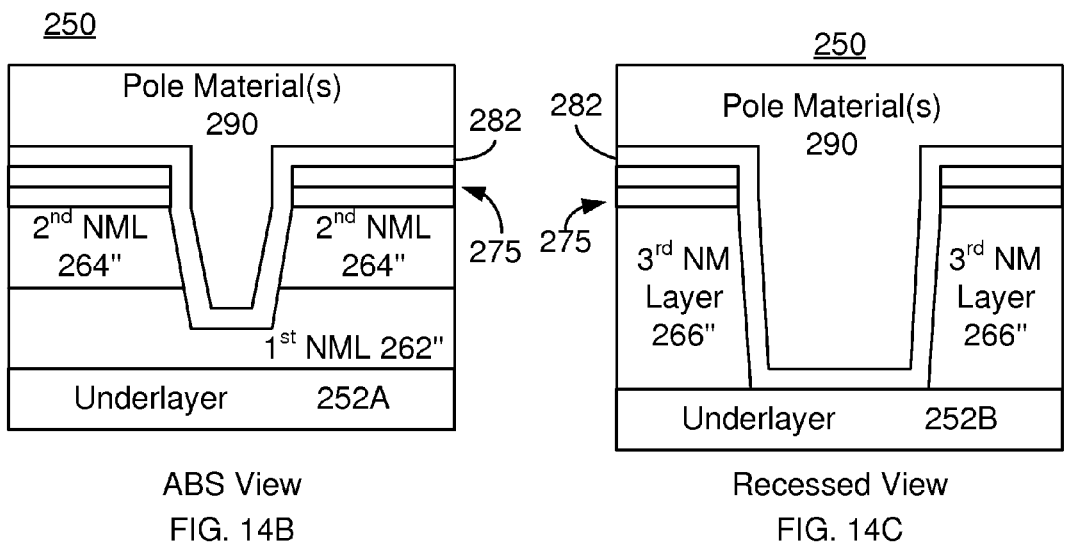
ABS View
FIG. 14B
Recessed View
FIG. 14C
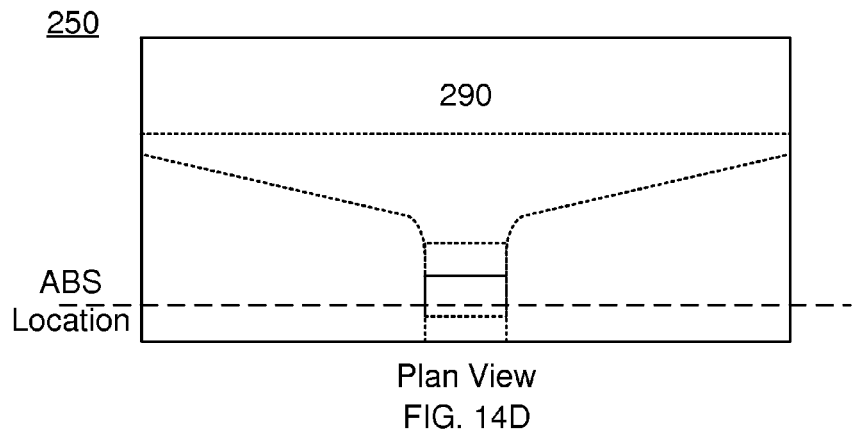
Plan View
FIG. 14D Side View ABS View Recessed View Plan View

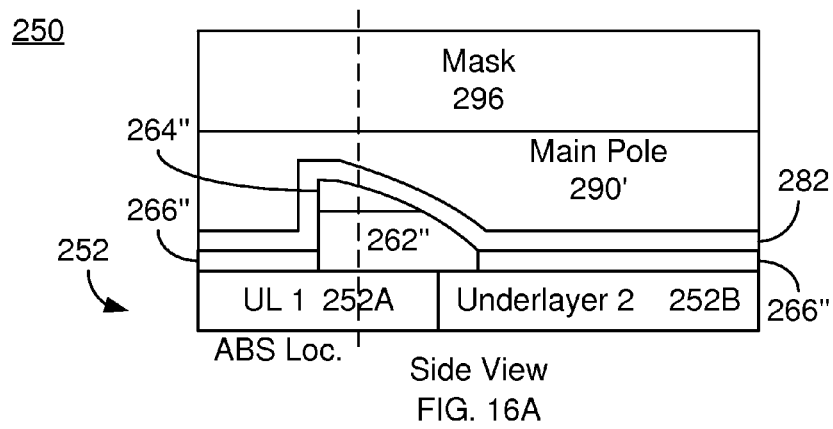
Side View
FIG. 16A
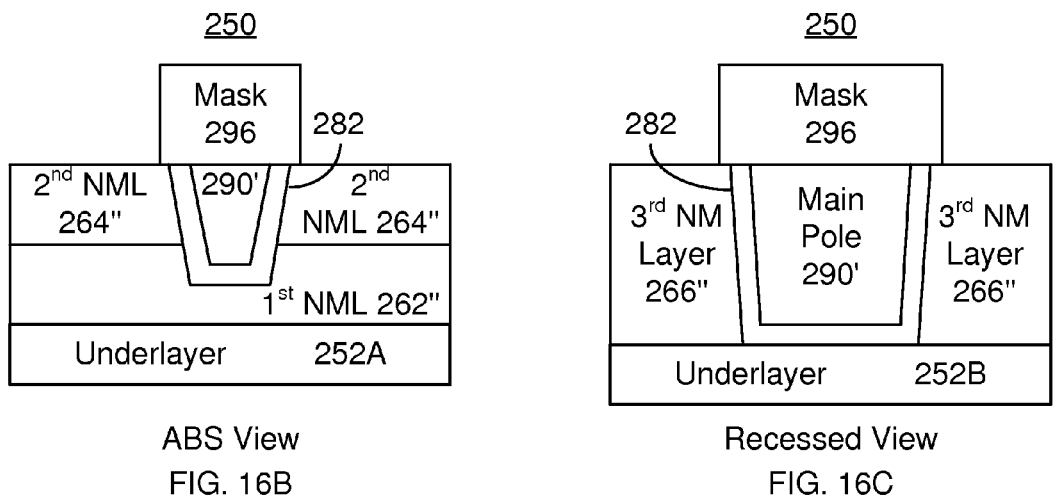
ABS View
FIG. 16B
Recessed View
FIG. 16C
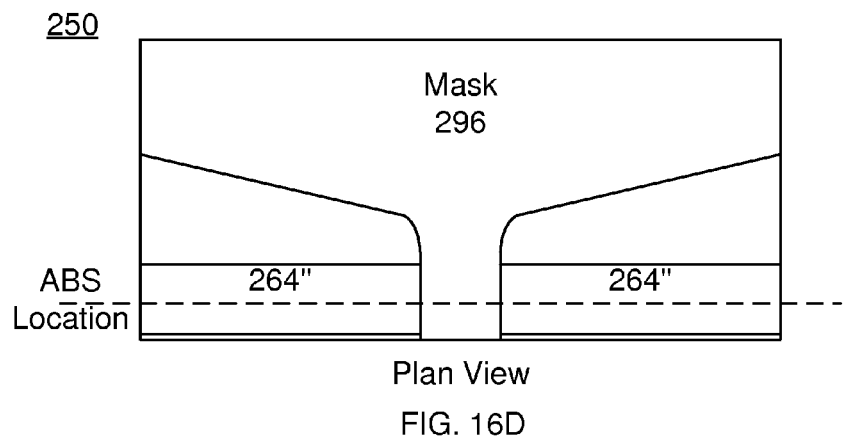
Plan View
FIG. 16D

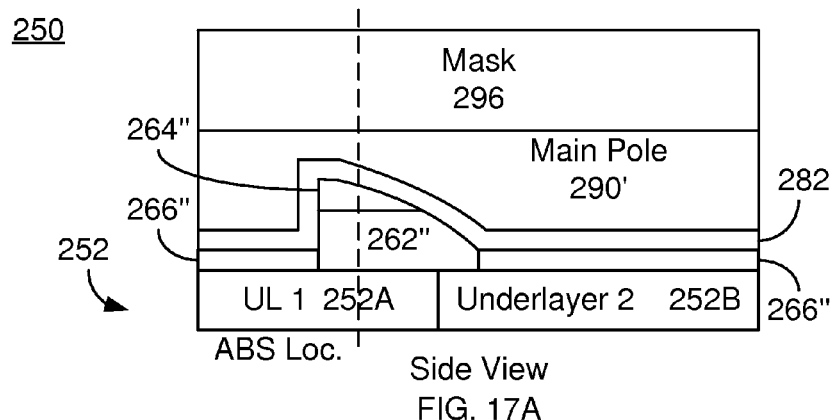
Side View
FIG. 17A
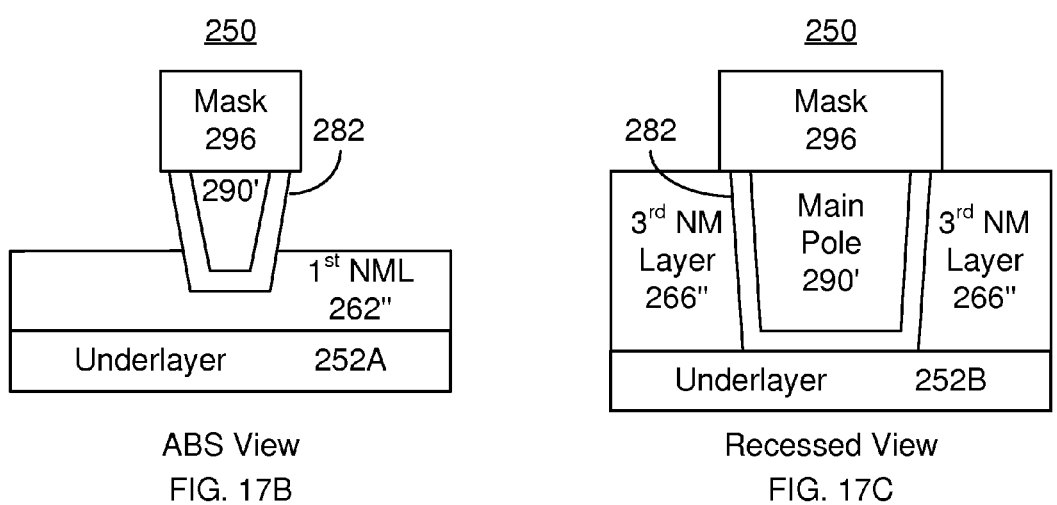
ABS View
FIG. 17B
Recessed View
FIG. 17C
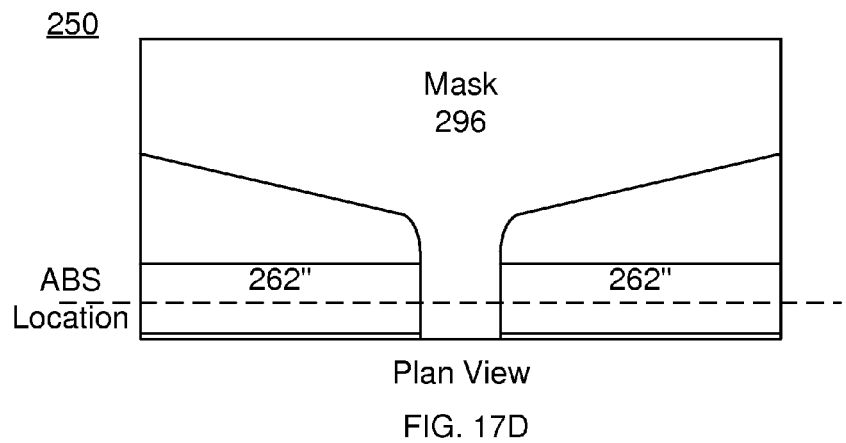
Plan View
FIG. 17D Side View ABS View Recessed View Plan View

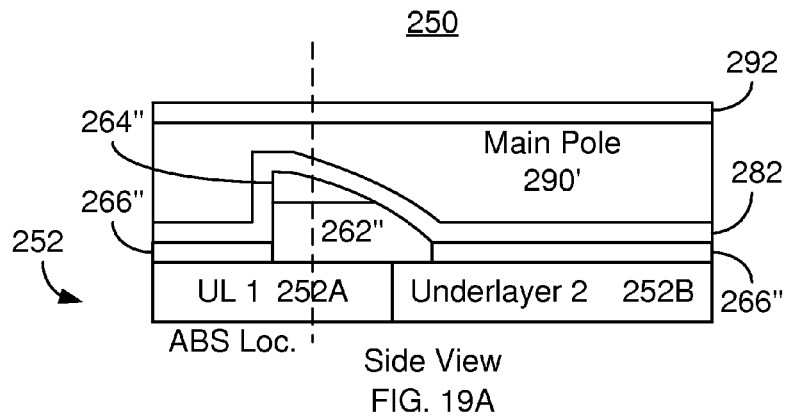
Side View
FIG. 19A
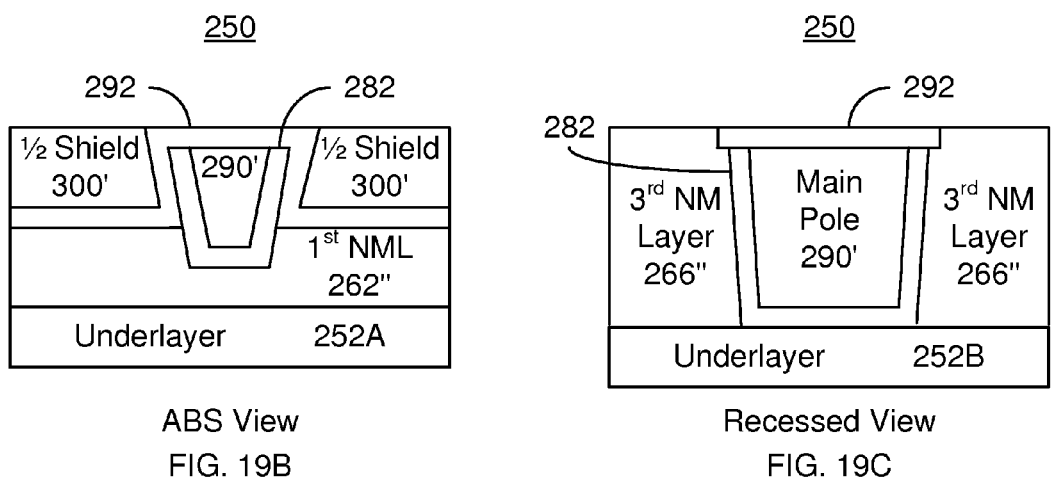
ABS View
FIG. 19B
Recessed View
FIG. 19C
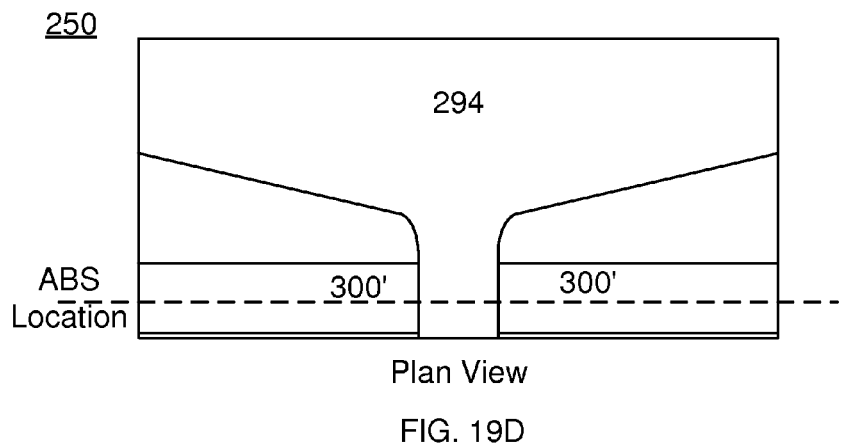
Plan View
FIG. 19D

METHOD FOR FABRICATING A MAGNETIC WRITER HAVING HALF-SIDE SHIELDS

CROSS-REFERENCE TO RELATED APPLICATION(S)

This application claims priority to provisional U.S. Patent Application Ser. No. 61/946,564, filed on Feb. 28, 2014, which is hereby incorporated by reference in its entirety.

BACKGROUND

FIG. 1 depicts an air-bearing surface (ABS) view of a conventional magnetic recording transducer 10. The magnetic recording transducer 10 may be a perpendicular magnetic recording (PMR) head. The conventional transducer 10 includes an underlayer 12, side gap 14, side shields 16, top gap 17, optional top, or trailing, shield 18 and main pole 20.

The main pole 20 resides on an underlayer 12 and includes sidewalls 22 and 24. The sidewalls 22 and 24 of the conventional main pole 20 form an angle α0 with the down track direction at the ABS. The side shields 16 are separated from the main pole 20 by a side gap 14. The side shields 16 extend at least from the top of the main pole 20 to the bottom of the main pole 20. The side shields 16 also extend a distance back from the ABS. The gap 14 between the side shields 16 and the main pole 20 may have a substantially constant thickness. Thus, the side shields 16 are conformal with the main pole 20.

Although the conventional magnetic recording head 10 functions, there are drawbacks. In particular, the conventional magnetic recording head 10 may not perform sufficiently at higher recording densities. For example, at higher recording densities, a shingle recording scheme may be desired to be sued. In shingle recording, successive tracks partially overwrite previously written tracks in one direction only. Part of the overwritten tracks, such as their edges, are preserved as the recorded data. In shingle recording, the size of the main pole 20 may be increased for a given track size. However, in order to mitigate issues such as track edge curvature, shingle writers have very narrow side gaps 14. Other design requirements may also be present. The magnetic transducer 10 may not perform as desired or meet the design requirements for such recording schemes. Without such recording schemes, the conventional transducer 10 may not adequately perform at higher areal densities. Accordingly, what is needed is a system and method for improving the performance of a magnetic recording head.

BRIEF DESCRIPTION OF SEVERAL VIEWS OF THE DRAWINGS

FIGS. 3A, 3B, 3C and 3D depict side, ABS, yoke and apex views of an exemplary embodiment of a magnetic recording disk drive.

FIGS. 5A, 5B and 5C through 19A, 19B, 19C and 19D depict various views of an exemplary embodiment of a magnetic recording transducer fabricated using the method.

DETAILED DESCRIPTION OF THE PREFERRED EMBODIMENTS

Figure 1:
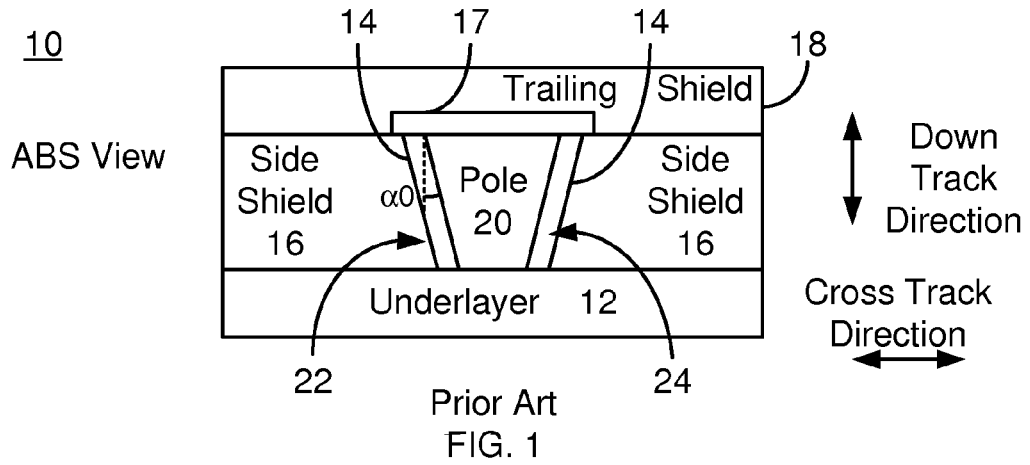
FIG. 1 depicts an ABS view of a conventional magnetic recording head.
Figure 2:
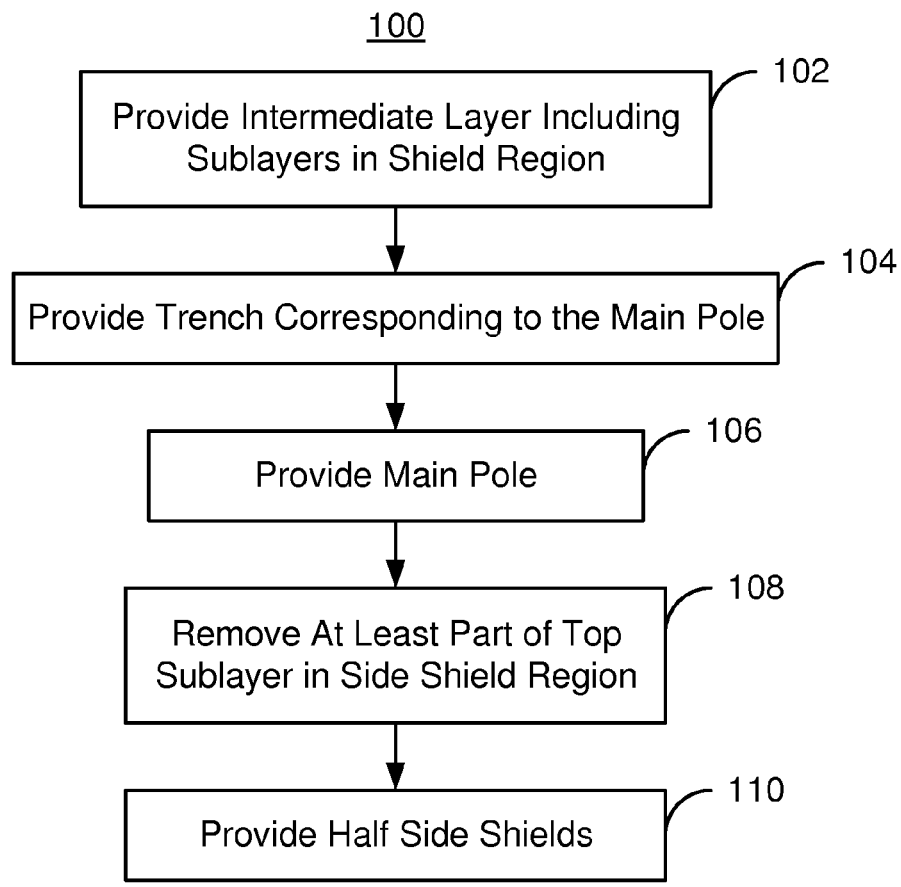
FIG. 2 depicts a flow chart of an exemplary embodiment of a method for providing a magnetic recording transducer having a half side shield.

FIG. 2 depicts an exemplary embodiment of a method 100 for providing a magnetic recording transducer. For simplicity, some steps may be omitted, interleaved, combined and/or performed in another order. The method 100 is described in the context of providing a magnetic recording disk drive and transducer 200. However, the method 100 may be used to fabricate multiple magnetic recording transducers at substantially the same time. The method 100 is also described in the context of particular layers. A particular layer may include multiple materials and/or multiple sub-layers. The method 100 also may start after formation of other portions of the magnetic recording head. For example, the method 100 may start after a read transducer, return pole/shield and/or other structure have been fabricated.

An intermediate layer including at least two sublayers is provided, via step 102. In at least the region in which the side shields are to be formed (shield region), the intermediate layer includes a first sublayer and a second sublayer. The first and second sublayer may be removed using different processes. The second sublayer is on the first sublayer. In some embodiments, the first sublayer includes silicon oxide, while the second sublayer includes aluminum oxide. A third sublayer may be outside of the shield region. However, the top of the third sublayer is desired to be substantially coplanar with the top of the second sublayer. Stated differently, the top of the intermediate layer is desired to be substantially flat so that fabrication may take place with less variations in topography of the intermediate layer. In some embodiments, the third sublayer may be formed of the same material as the first sublayer. Thus, the third sublayer may include silicon oxide. The first sublayer may thus be considered part of the first sublayer whether the first and third sublayers are formed separately or together. In some embodiments, step 102 includes full-film depositing first and second layers, then removing the portions of these layers outside of the side shield region. The first and second sublayers thus remain in the side shield region. The third sublayer may then be deposited and the layer(s) planarized. Thus, the intermediate layer may be formed.

A trench is formed in an intermediate layer using one or more etches, via step 104. The trench formed has the desired geometry and location for formation of the main pole. For example, the top of the trench may be wider than the bottom so that the top of the main pole may be wider than the bottom. The sidewall angles may also vary. For example, the sidewall angles at and near the ABS may be larger (further from perpendicular to the surface of the intermediate layer) than the sidewall angles in regions recessed from the ABS (termed the yoke herein). For example, the sidewalls may be substantially perpendicular to the bottom of the trench in the yoke region, but twelve to sixteen degrees from the down track direction near the ABS. In other embodiments, other sidewall angles and/or other variations in sidewall angles may be possible. In some embodiments, step 104 controls the sidewall angles through the use of multiple etches and/or etch conditions for each etch. Further, the trench extends at least partially into the first sublayer in the shield region. In some embodiments, some or all of the trench may extend through the first sublayer. Thus, the top of the first sublayer resides between the bottom and the top of the trench.

The main pole is provided in the trench, via step 106. In some embodiments, step 106 includes depositing a seed layer, such as Ru and/or magnetic seed layer(s). High saturation magnetization magnetic material(s) are also provided. For example, such magnetic materials may be plated and/or vacuum deposited. The pole formed in step 106 may be conformal to the trench, nonconformal with the trench, or include both conformal and nonconformal portions. The top of the first sublayer is between the bottom of the main pole and the top of the main pole in the shield region.

At least part of the second sublayer in the shield region is removed, via step 108. Step 108 may be performed using a wet etch appropriate for the second sublayer, but not the first or third sublayers.

The side shield(s) are provided in the shield region, via step 110. Step 110 may include plating or otherwise providing the material(s) for the side shields. The bottoms of the side shields reside on the top of the first sublayer in the shield region. Thus, the side shield(s) extend to a location between the top and the bottom of the main pole. The side shields are thus termed half side shields. Note, however, that the half shields need not extend precisely halfway down between the top and bottom of the main pole. Instead, the half side shields terminate somewhere between the top and bottom of the main pole.

Using the method 100, a magnetic transducer having improved performance may be fabricated. A shingle writer may not need to have side shield(s) which extend to the bottom of the main pole. Thus, the method 100 may provide a main pole that may be used in shingle recording. Thus, the benefits of shingle recording may be exploited. The location of the bottom of the half side shields may be set by the thickness of the first sublayer. Thus, the side shield geometry may be predefined. As such, the method 100 may be simplified.

FIGS. 3A, 3B, 3C and 3D depict various views of a transducer 200 fabricated using the method 100. FIG. 3A depicts a side view of the disk drive. FIGS. 3B and 3C depict AS and yoke views of the transducer 200. FIG. 3D depicts an apex (side/cross-sectional) view of the transducer 200. The "yoke" view shown in FIG. 3C is taken at location x1 shown in FIG. 3D. For clarity, FIGS. 3A-3D are not to scale. For simplicity not all portions of the disk drive and transducer 200 are shown. In addition, although the disk drive and transducer 200 are depicted in the context of particular components other and/or different components may be used. For example, circuitry used to drive and control various portions of the disk drive is not shown. For simplicity, only single components are shown. However, multiples of each components and/or their sub-components, might be used. The disk drive 100 may be a perpendicular magnetic recording (PMR) disk drive. However, in other embodiments, the disk drive 100 may be configured for other types of magnetic recording included but not limited to heat assisted magnetic recording (HAMR).

The disk drive includes a media 202, and a slider 204 on which a transducer 200 have been fabricated. Although not shown, the slider 204 and thus the transducer 200 are generally attached to a suspension. In general, the slider 204 includes the write transducer 200 and a read transducer (not shown). However, for clarity, only the write transducer 200 is shown.

The transducer 200 includes an underlayer 206, an intermediate layer 208, a main pole 210, coil(s) 220 and half shields 230. The underlayer 206 may include a bottom (or leading edge) shield. The coil(s) 220 are used to energize the main pole 210. Two turns are depicted in FIG. 3A. Another number of turns may, however, be used. Note that only a portion of the coil(s) 210 may be shown in FIG. 3A. If, for example, the coil(s) 220 is a spiral, or pancake, coil, then additional portions of the coil(s) 220 may be located further from the ABS. Further, additional coils may also be used.

The intermediate layer 208 may include one or more sublayers. However, one or more of the sublayers may have been removed for formation of the half shields 230. Further, the layers may be vertical and/or may be into the plane of the page. For example, the intermediate layer 208 in the recessed view may be formed of different material(s) than in the ABS view. As can be seen in FIGS. 3B-3C, the top of the intermediate layer 208 is between the top of the main pole and the bottom of the main pole in the shield region.

The main pole 210 is shown as having a top wider than the bottom. The main pole 210 thus includes sidewalls 217 and 218 having sidewall angles, $\alpha 0$ and $\alpha 1$ that are greater than or equal to zero. In the embodiment shown, these sidewall angles differ at different distances from the ABS. In some embodiments, $\alpha 0$ (at the ABS) is at least three degrees and not more than fifteen degrees. In some such embodiments, $\alpha 0$ is at least six and not more than nine degrees. The sidewall angle is larger at the ABS than recessed from the ABS. Although $\alpha 1$ is shown as nonzero, in some embodiments, the sidewall angle for the main pole 210 is zero degrees (substantially vertical sidewalls). For example, $\alpha 1$ may be at least zero degrees and not more than five degrees. In some embodiments, $\alpha 1$ is not more than three degrees. Thus, the sidewall angles may decrease to zero as the distance from the ABS increases. However, in other embodiments, other geometries may be used. For example, the top may be the same size as or smaller than the bottom. The sidewall angles may vary in another manner including, but not limited to, remaining substantially constant. FIGS. 3B and 3C depict the main pole 210 as being conformal with the trench in the intermediate layer 208. In some embodiments, however, at least a portion of the main pole 210 is not conformal with the sides of the trench. In some embodiments, the main pole 210 may have leading surface bevel 214 and/or trailing surface bevels 216, as shown in FIG. 3D.

The half shields 230 are shown as including a trailing shield portion. This is denoted by a dotted line in FIG. 3B. In other embodiments, the trailing shield may be omitted. The half side shields 230 are also shown as having a constant thickness in FIG. 3D. Thus, the dashed line corresponding to the bottom of the half shield 230 is perpendicular to the ABS. In other embodiments, the geometry of the half shields 230 may vary. For example, the shields 230 track the trailing edge of the pole such that the shield covers less of the pole further from the ABS. In other embodiments, the half shield thickness may vary. In such embodiments, the bottom of the half shield 230 may be parallel to the leading bevel 214 or the trailing bevel 216 while the top surface is perpendicular to the ABS. Other variations are also possible. However, note that bottom of the half shield 230 is between the top and bottom of the pole 210

The magnetic transducer 200 in the disk drive may be used in shingle recording. Thus, the benefits of shingle recording may be achieved. For example, higher areal density recording may be performed by a head having larger critical dimensions.

Figure 4:
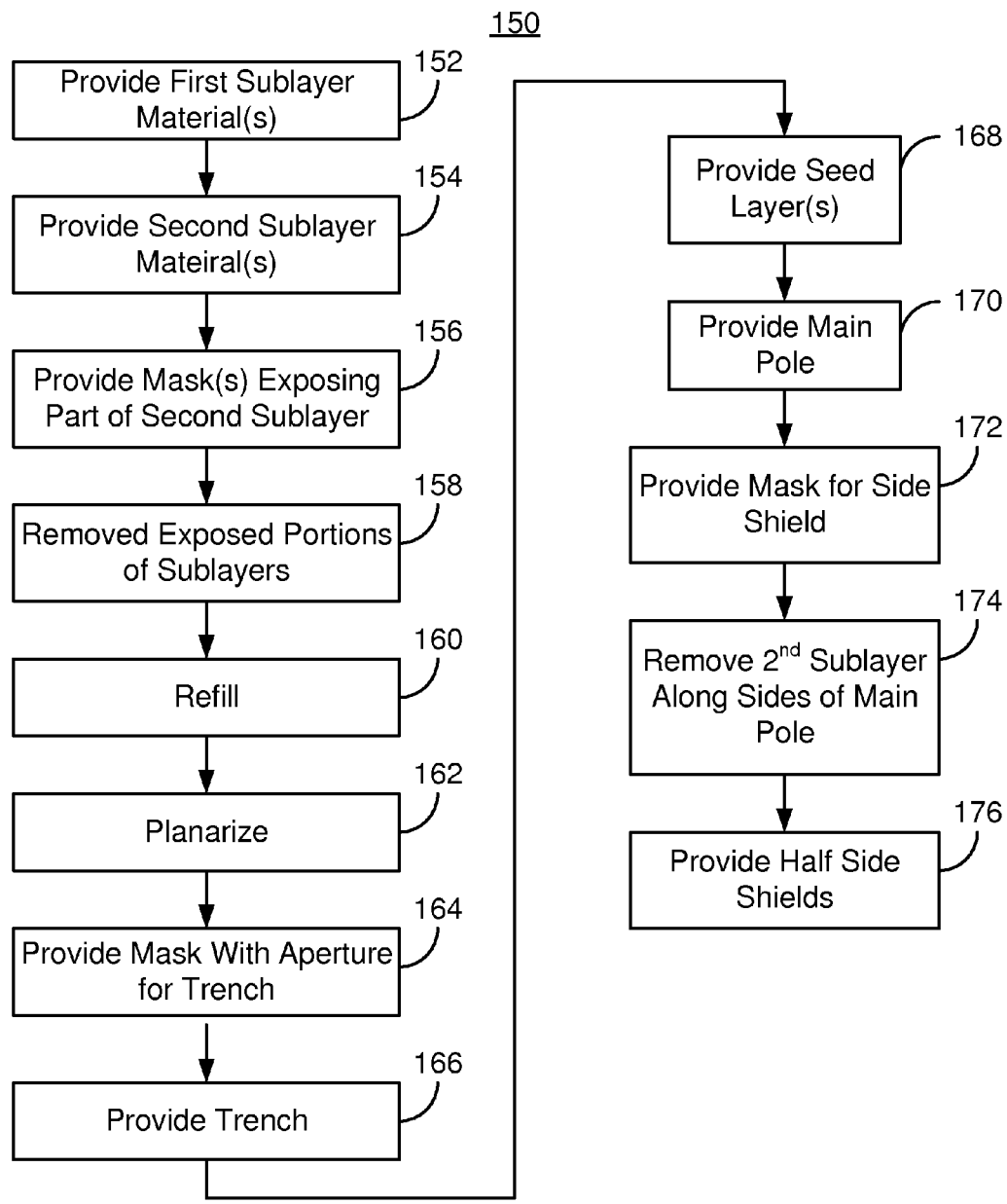
FIG. 4 depicts a flow chart of another exemplary embodiment of a method for providing a magnetic recording transducer having half side shields.

FIG. 4 depicts an exemplary embodiment of a method 150 for providing a pole for a magnetic recording transducer having a half shield. For simplicity, some steps may be omitted, interleaved, performed in another order and/or combined. The method 150 is also described in the context of providing a magnetic recording transducer 250 depicted in FIGS. 5A-5C though FIGS. 19A-19D depict an exemplary embodiment of a transducer 250 during fabrication using the method 150. The method 150 may be used to fabricate multiple magnetic recording heads at substantially the same time. The method 150 may also be used to fabricate other magnetic recording transducers. The method 150 is also described in the context of particular layers. A particular layer may include multiple materials and/or multiple sub-layers. The method 150 also may start after formation of other portions of the magnetic recording transducer. For example, the method 150 may start after a read transducer, return pole/shield and/or other structure have been fabricated.

Figure 5A:
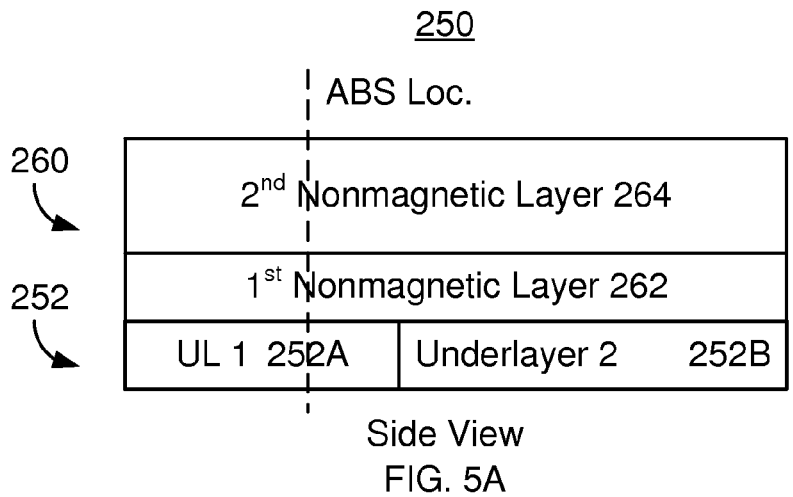
Figure 5B:
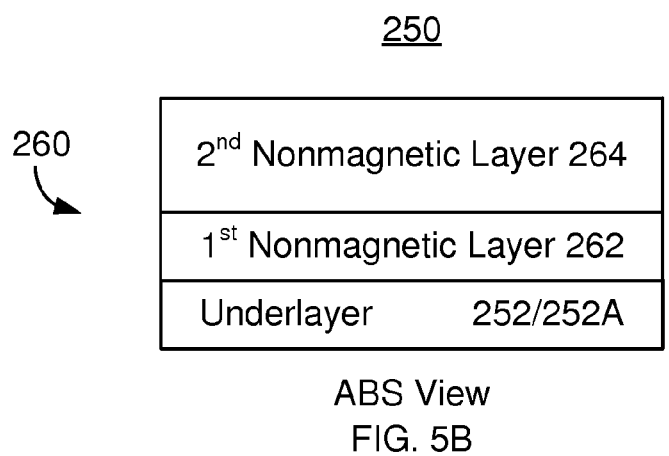
Figure 5C:
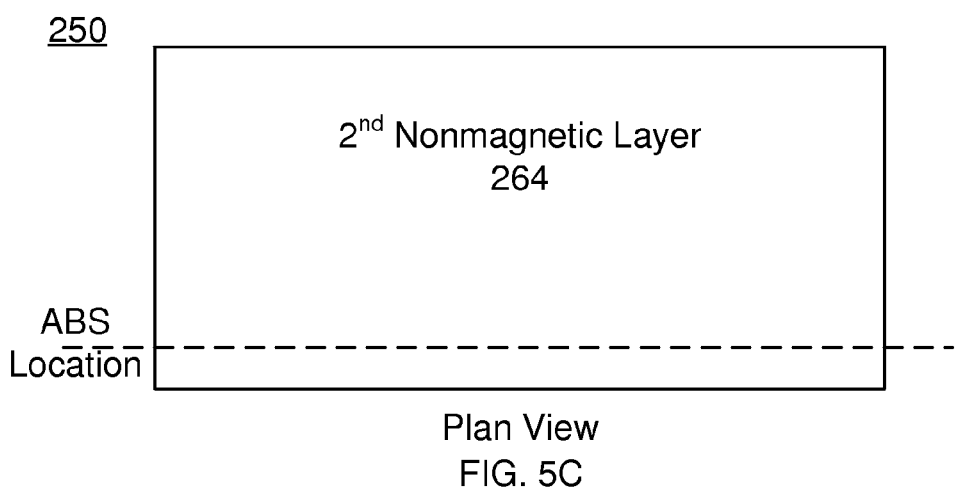

The material(s) for the first sublayer are full-film deposited, via step 152. In some embodiments, step 152 includes full-film depositing silicon oxide. The material(s) for the second sublayer are full-film deposited, via step 154. Step 154 may include depositing aluminum oxide on the silicon oxide layer. FIGS. 5A, 5B and 5C depict side (apex), ABS and plan views of the transducer 250 after step 154 has been performed. Thus, the first nonmagnetic layer 262 has been provided on the underlayer 252. The nonmagnetic layer 264 has been deposited on the first nonmagnetic layer 262. A portion of the first nonmagnetic layer 262 forms at least part of the first sublayer discussed above. A portion of the second nonmagnetic layer 264 forms the second sublayer. Thus, the first nonmagnetic layer 262 may be silicon oxide while the second nonmagnetic layer 264 may be aluminum oxide. Other materials may be used, but the first and second nonmagnetic layer are desired to be removable using different processes for at least some etches. For example, a particular wet etch that would remove the second nonmagnetic layer 264 would not remove the first nonmagnetic layer 252. However, other etches may remove both layers 262 and 264. Both nonmagnetic layers 252 and 254 may be desired to be relatively easily patternable. The total thickness of the nonmagnetic layers 252 and 254 may be at least that desired for the main pole. For example, in some embodiments, the first nonmagnetic layer 262 is at least eight hundred Angstroms thick and not more than one thousand Angstroms thick. The second nonmagnetic layer 264 is at least two thousand Angstroms thick and not more than two thousand four hundred Angstroms thick in some embodiments. Also shown is underlayer 252. The underlayer 252 may include two sublayers. Underlayer 252A may be a NiFe layer used as a leading shield, while underlayer 252B may be a Ru layer. However, in other embodiments, other configurations, including other material(s) may be used. Together, the layers 262 and 264 form layer 260.

Figure 6A:
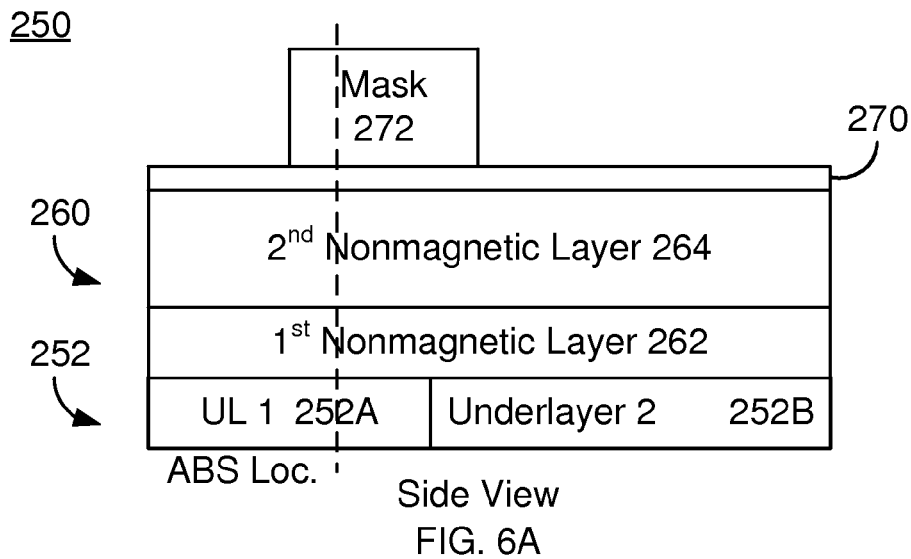
Figure 6B:
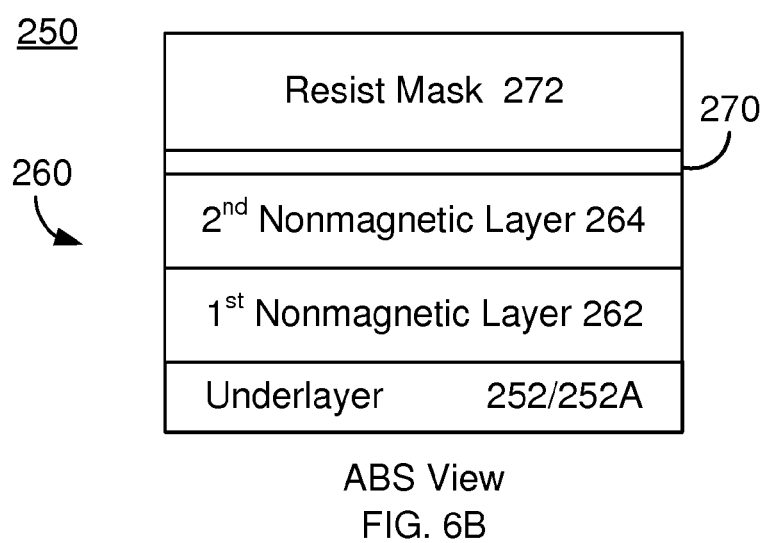
Figure 6C:
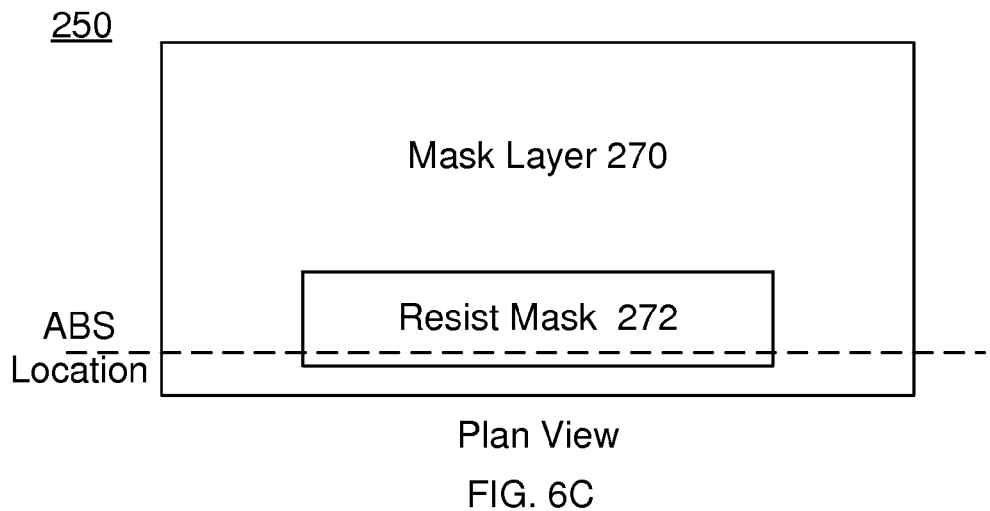
Figure 7A:
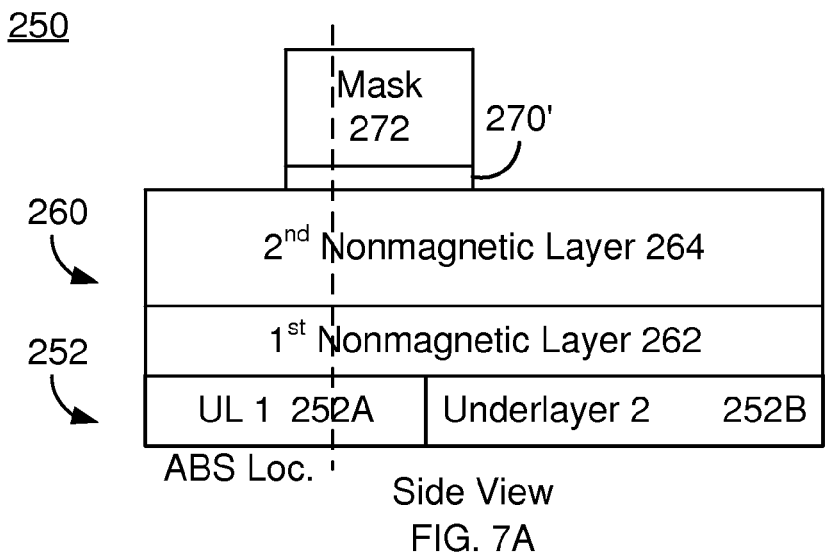
Figure 7B:
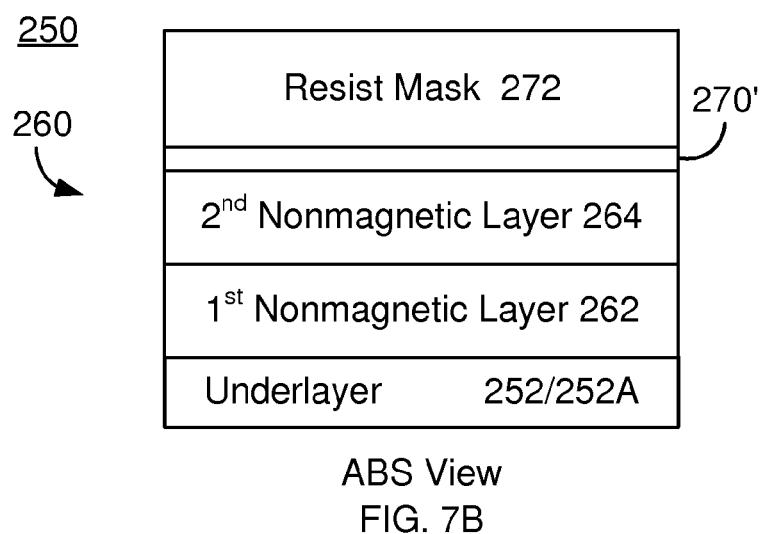
Figure 7C:
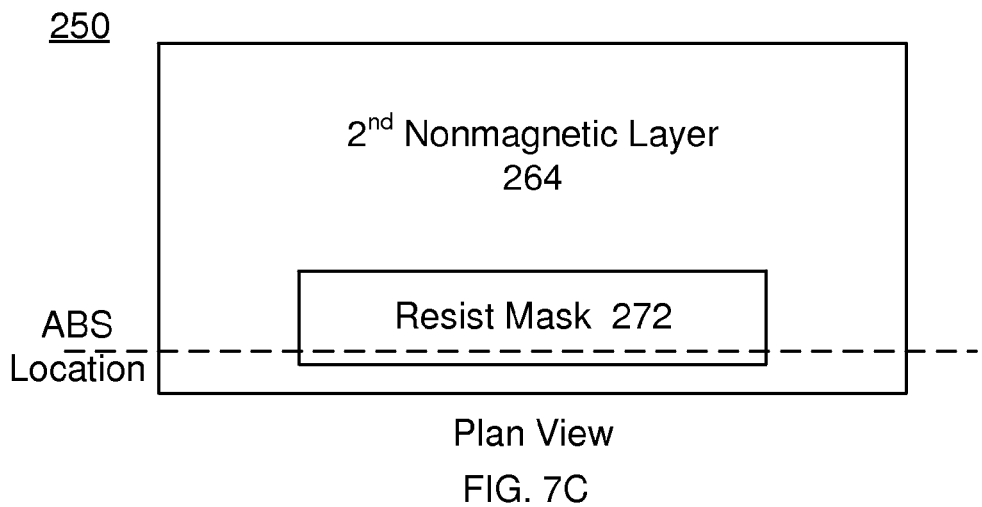

A mask that exposes a part of the second nonmagnetic layer 265 is provided, via step 156. Step 156 may include providing a hard mask layer, such as Cr on the second nonmagnetic layer 264. A photoresist mask that covers a portion of the transducer 250 in which the shields are to be formed is provided. FIGS. 6A, 6B and 6C depict side, ABS and plan views of the transducer 250 after these portions of step 156 have been performed. Thus, a hard mask layer 270 and photoresist mask 272 are shown. The hard mask layer may then be etched through as part of step 156. FIGS. 7A, 7B and 7C depict side, ABS and plan views of the transducer 250 after these portions of step 156 have been performed. Thus, hard mask 270' is shown.

Figure 8A:
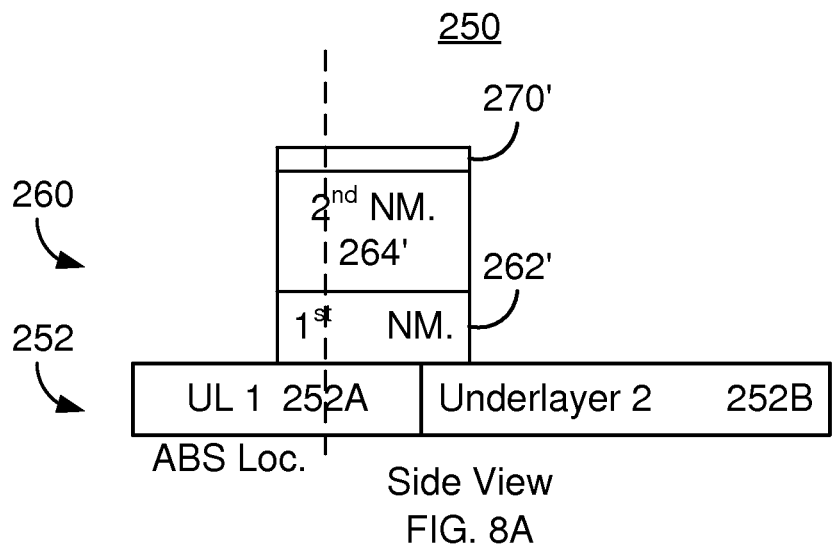
Figure 8B:
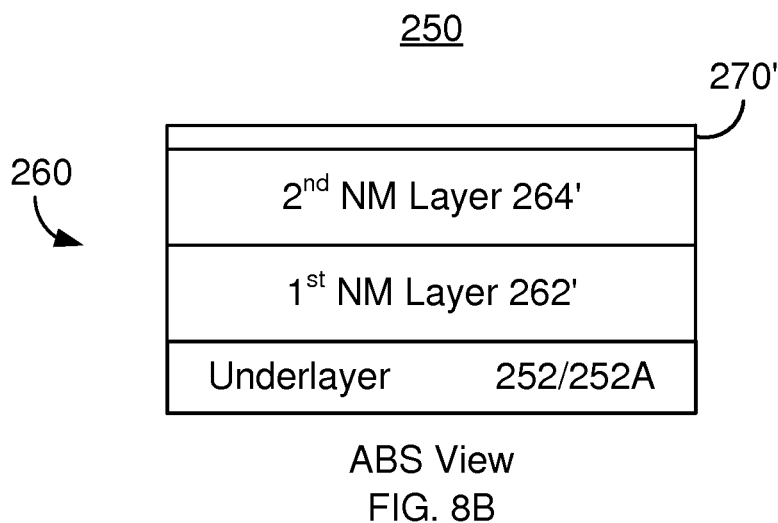
Figure 8C:
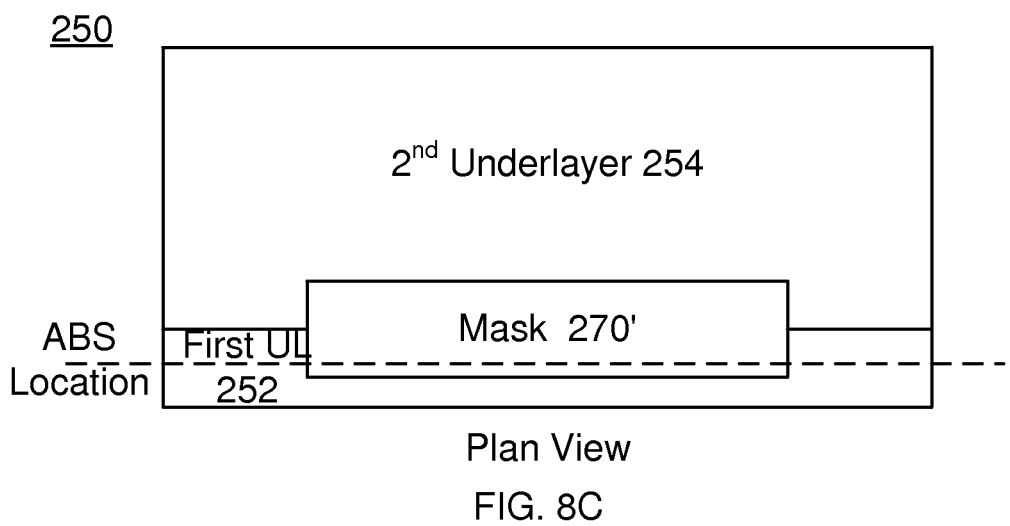

The exposed portions of the first nonmagnetic layer 262 and the second nonmagnetic layer 264 may then be removed, via step 158. Step 158 may be performed using a reactive ion etch (RIE) that is capable of removing both layers 262 and 264. Although some etches (such as a wet etch) may remove only one of the layers 262 or 264, in some embodiments, other etches may remove both. An RIE may be desirable because such an etch may be highly anisotropic, resulting in vertical sidewalls. FIGS. 8A, 8B and 8C depict side, ABS and plan views of the transducer 250 after step 158 has been performed. Thus, the nonmagnetic layers 262' and 264' as well as hard mask 270' remain. The mask 272 has been removed. In the embodiment shown in FIGS. 8A-8C, an RIE has been used in step 158 resulting in vertical sidewalls for the first nonmagnetic layer 262' and for the second nonmagnetic layer 264'.

Figure 9A:
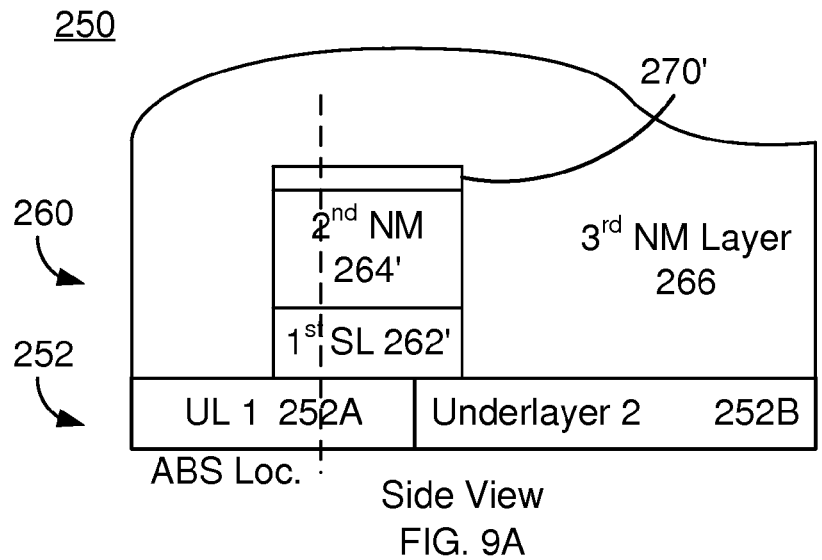
Figure 9B:
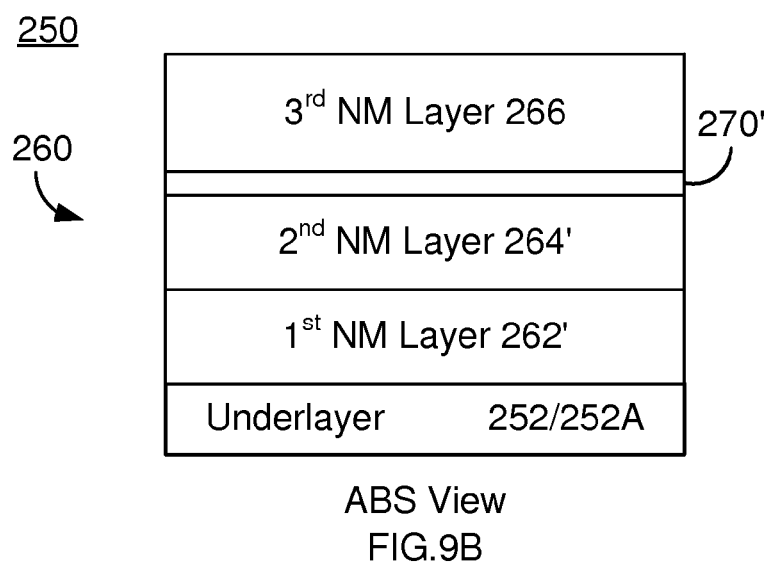
Figure 9C:
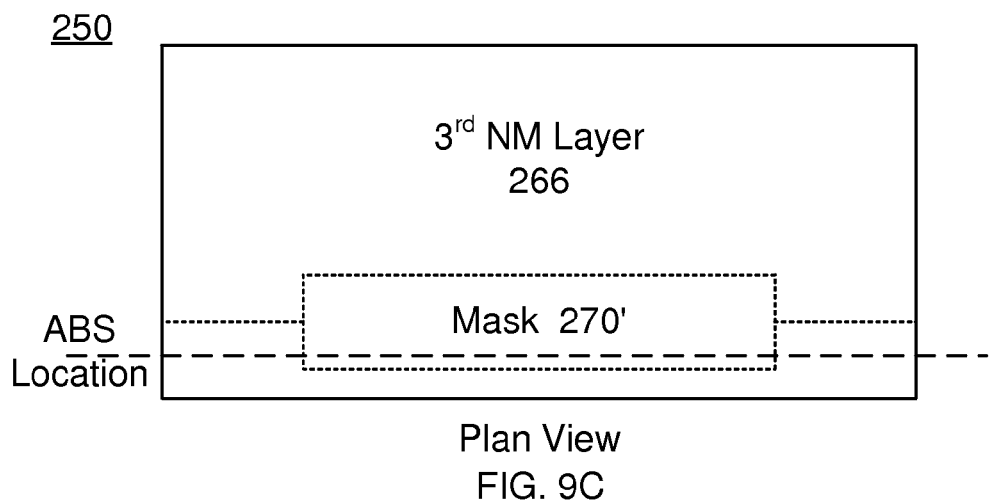

A refill step is performed, via step 160. Step 160 includes full film depositing a third nonmagnetic layer for the intermediate layer. The third nonmagnetic layer may be insulating. In some embodiments, the third nonmagnetic layer is the same material as the first nonmagnetic layer 262'. Thus, step 160 may include full film depositing a silicon oxide layer. FIGS. 9A, 9B and 9C depict side, ABS and plan views of the transducer 250 after step 160 has been performed. Thus, the third nonmagnetic layer 266 is shown.

Figure 10A:
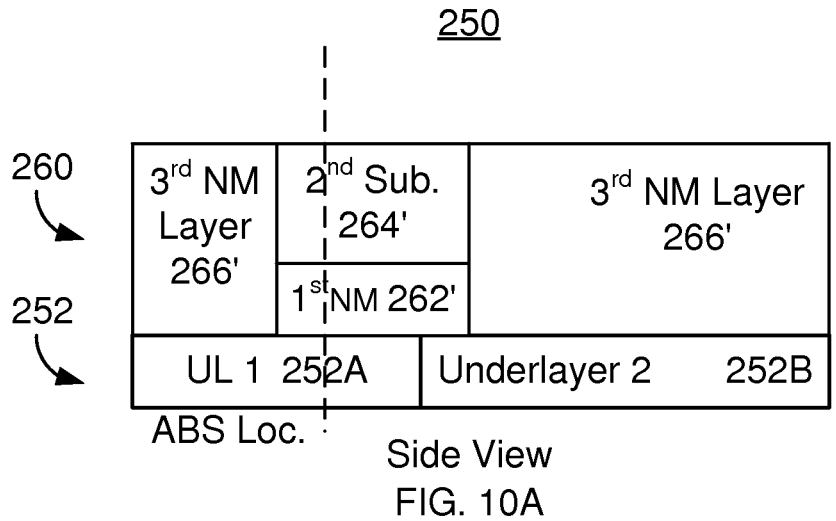
Figure 10B:
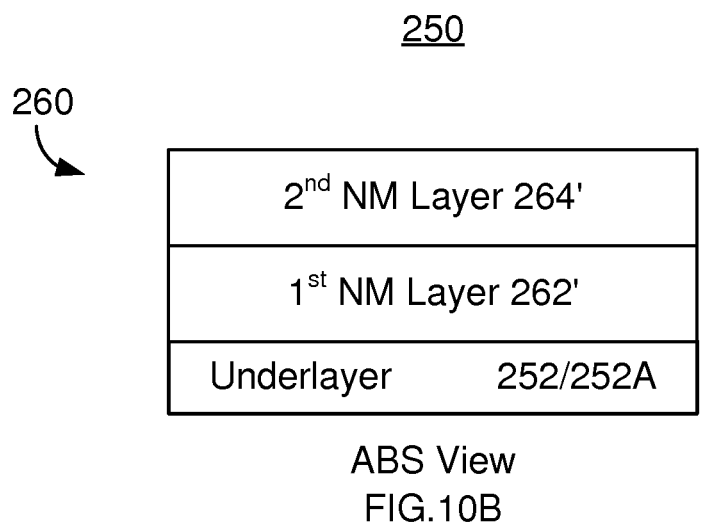
Figure 10C:
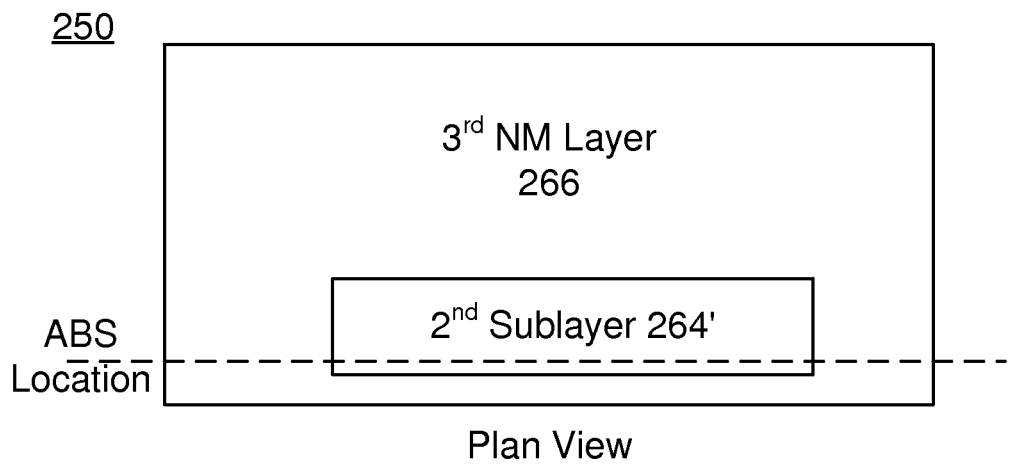

A planarization is then performed, via step 162. The planarization of step 162 may be a chemical mechanical planarization (CMP). Thus, the top of the third nonmagnetic layer 266 is desired to be substantially coplanar with the top of the second nonmagnetic layer 264'. In addition, an ion mill or analogous removal step may be performed to remove the hard mask 270'. FIGS. 10A, 10B and 10C depict side, ABS and plan views of the transducer 250 after step 162 has been performed. Thus, the third nonmagnetic layer 266' has been planarized. Because nonmagnetic layers 262' and 266' may be formed of the same material, they may be considered to form a first sublayer of the intermediate layer. The remaining portion of the second nonmagnetic layer 264' may form a second sublayer of the intermediate layer 260. Thus, steps 152-162 may be considered to be analogous to step 102.

Figure 11A:
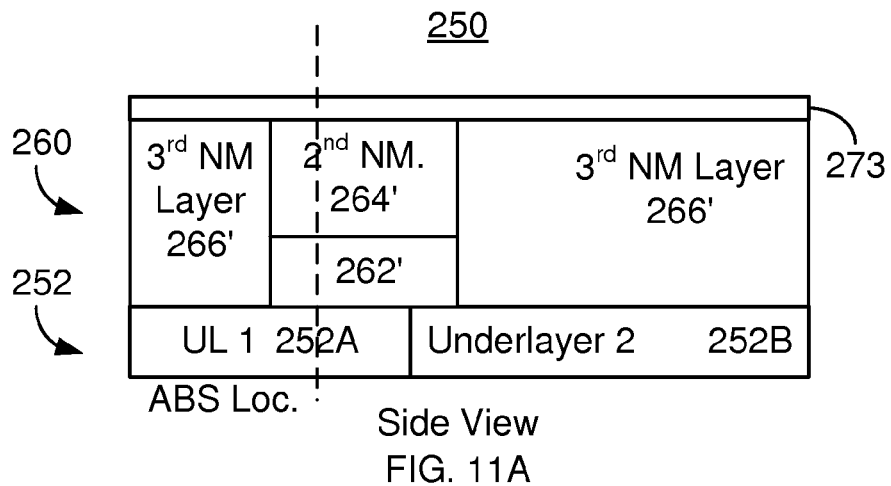
Figure 11B:
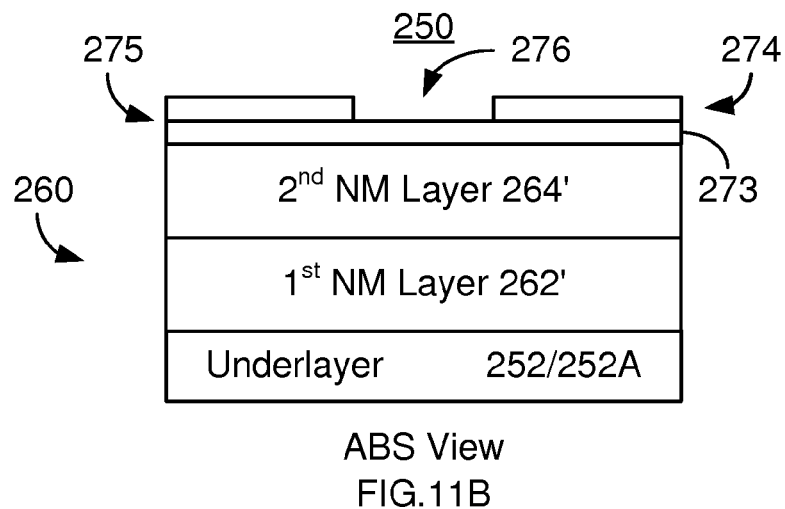
Figure 11C:
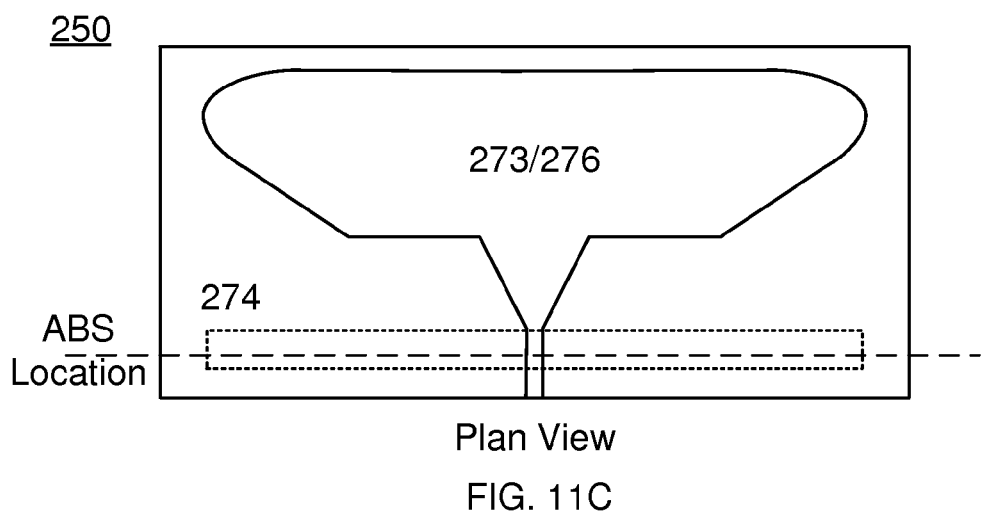
Figure 13A:
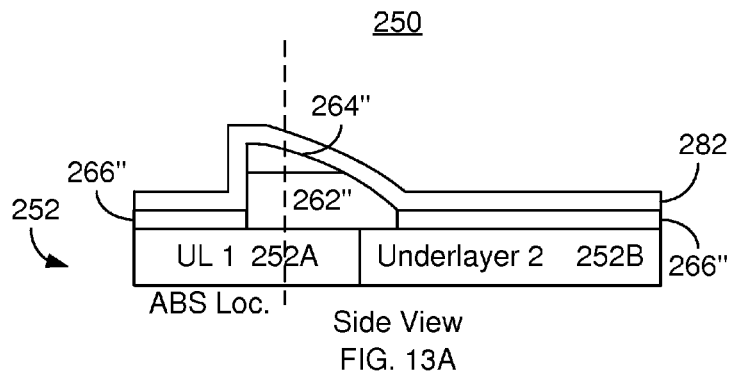
Figure 13B:
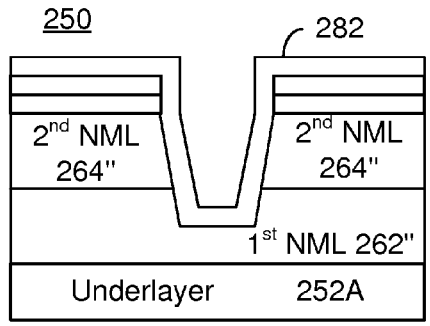
Figure 13C:
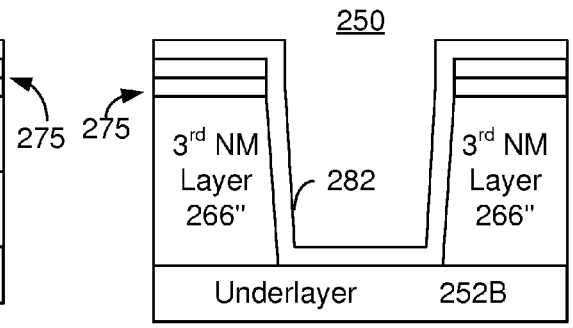
Figure 13D:
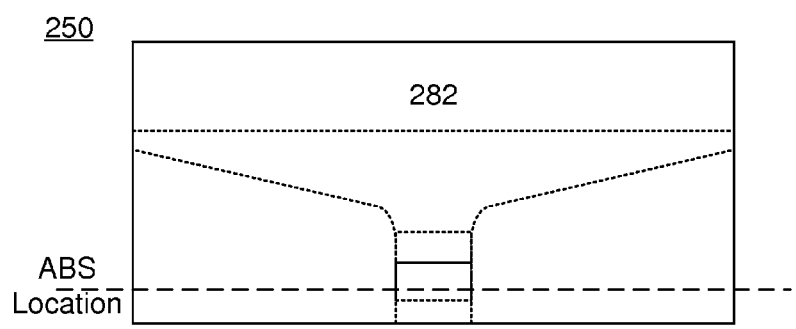
Figure 15A:
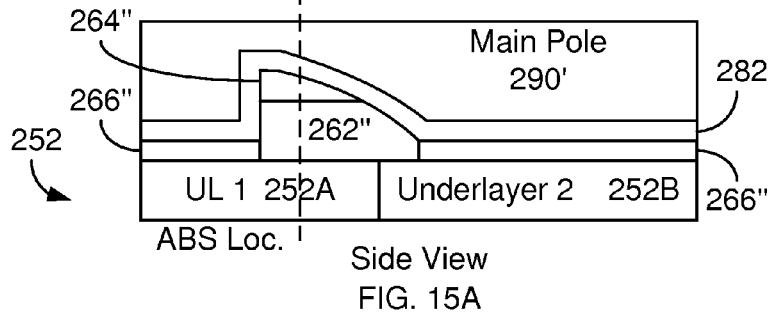
Figure 15B:
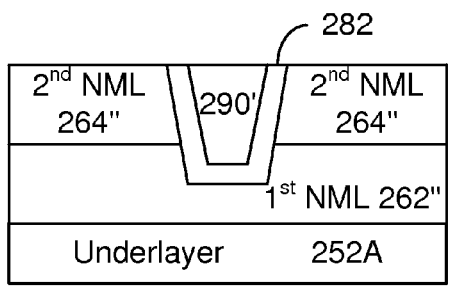
Figure 15C:
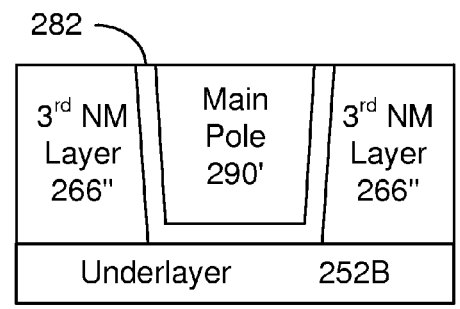
Figure 15D:
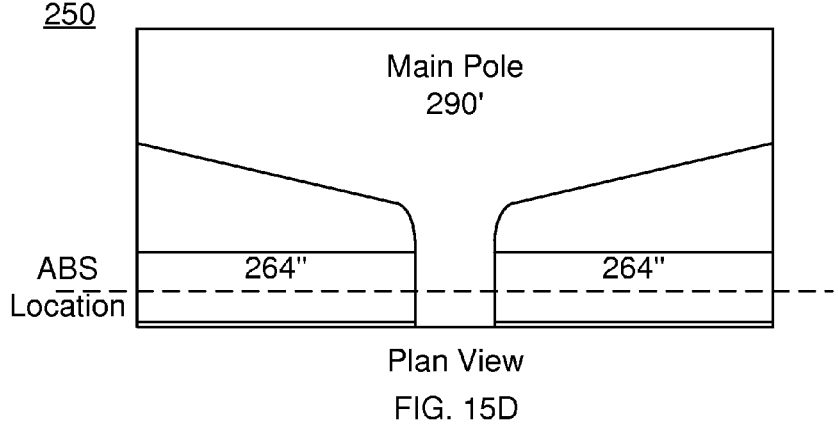

A mask is provided on the intermediate layer 260, via step 164. The mask includes an aperture that corresponds to a trench to be formed in the intermediate layer 260. Step 164 may be performed using a photoresist line. For example, a first hard mask layer, such as Ta, may be full film deposited. A photoresist mask having a line corresponding to the region of the pole near the ABS is then fabricated on the first hard mask layer. A second hard mask layer, such as Cr, is provided on the first hard mask layer and the photoresist mask. The photoresist is then removed. This may be accomplished by side milling the photoresist mask to remove the second hard mask layer, then performing a lift off. FIGS. 11A, 11B and 11C depict side, ABS and plan views of the transducer 250 after step 164 has been performed. Thus, a first hard mask layer 273 and a second hard mask layer 274 having an aperture 276 therein are shown. The first and second hard mask layers form hard mask 275.

A trench is formed in intermediate layer 260, via step 166. Step 166 may include performing an aluminum oxide RIE (or other RIE(s) appropriate for the layers 262' and 264'). In some embodiments, multiple RIEs are used to obtain the desired trench profile for various regions of the transducer 250. FIGS. 12A, 12B, 12C and 12D depict side, ABS, recessed and plan views of the transducer 250 after step 166 has been performed. Thus, a trench 280 has been formed in layers 262", 264" and 266'. As can be seen in FIGS. 12B and 12C, the sidewall angles of the trench may vary with distance from the ABS. In some embodiments, $\alpha 2$ is greater than $\alpha 1$. For example, $\alpha 2$ may be at least three and not more than fifteen degrees. In some such embodiments, $\alpha 2$ may be at least six and not more than nine degrees. In contrast, $\alpha 1$ may be less than or equal to three degrees. In addition, note that the trench 280 reaches the underlayer 252 in some regions. However, near the ABS, a portion of the layers 262" and 264" remain.

Seed layer(s) that are resistant to an etch of the intermediate layer 260 is deposited in the trench, via step 168. In some embodiments, this seed layer may serve as at least part of the gap. The seed layer may include material(s) such as Ru deposited using methods such as chemical vapor deposition. In other embodiments, a magnetic seed layer may be used in lieu of or in addition to a nonmagnetic seed layer. FIGS. 13A, 13B, 13C and 13D depict side, ABS, recessed and plan views of the transducer 250 after step 168 has been performed. Thus, seed layer 282 is shown.

The main pole may then be provided, via step 170. Step 170 includes depositing high saturation magnetization magnetic material(s), for example via electroplating. In some embodiments, the pole provided in step 170 fills the trench 280. However, in other embodiments, the pole may occupy only a portion of the trench. FIGS. 14A, 14B, 14C and 14D depict side, ABS, recessed and plan views of the transducer 250 after a portion of step 170 has been performed. In particular, the pole material(s) 290 have been provided. A planarization, such as a chemical mechanical planarization (CMP) may also be performed. A leading bevel may be naturally formed in the magnetic pole in step 170 due to the shape of the trench 280 and the deposition techniques used. A trailing bevel may also be provided in step 170. For example, a portion of the main pole may be covered by a mask after the planarization. Another portion of the main pole at and near the ABS may be removed, for example via an ion mill. FIGS. 15A, 15B, 15C and 15D depict side, ABS, recessed and plan views of the transducer 250 after step 170 has been completed. Thus, the portion of the main pole materials outside of the trench has been removed, forming main pole 290'. In the embodiment shown, no trailing (top) bevel has been formed. However, in alternate embodiments, such a trailing bevel may be formed before or after formation of the half shields.

A mask used in forming the side shield is provided, via step 172. FIGS. 16A, 16B, 16C and 16D depict side, ABS, recessed and plan views of the transducer 250 after step 172 has been performed. Thus, a mask 296 has been formed.

At least a portion of the second sublayer 264" outside of the trench 280 and inside of the shield regions is removed, via step 174. Step 174 may include performing an aluminum oxide wet etch. FIGS. 17A, 17B, 17C and 17D depict side, ABS, recessed and plan views of the transducer 250 after step 174 has been performed. Thus, the second sublayer 264" has been removed, leaving the first sublayer (first nonmagnetic layer 262" and third nonmagnetic layer 266").

Figure 18A:
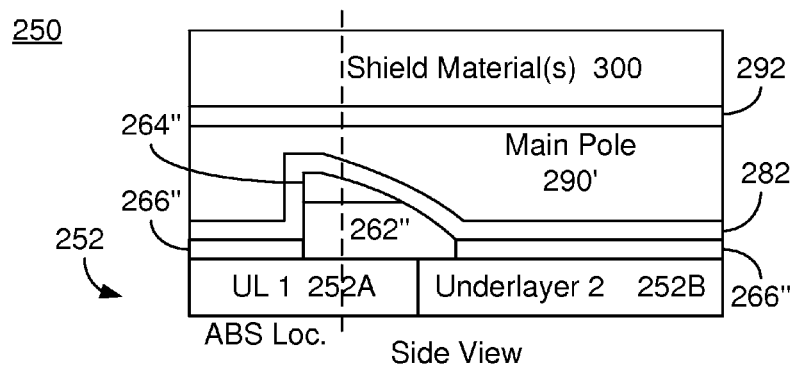
Figure 18B:
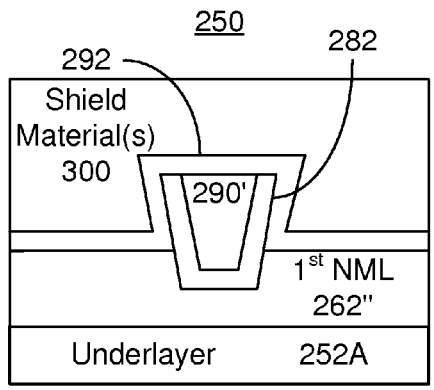
Figure 18C:
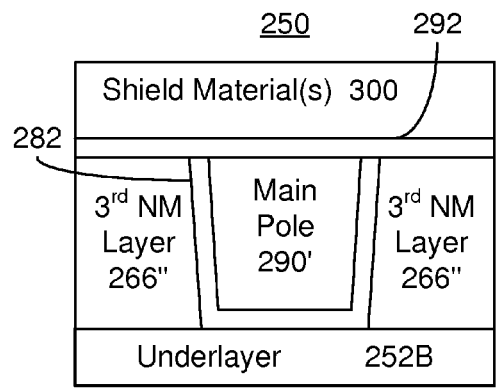
Figure 18D:
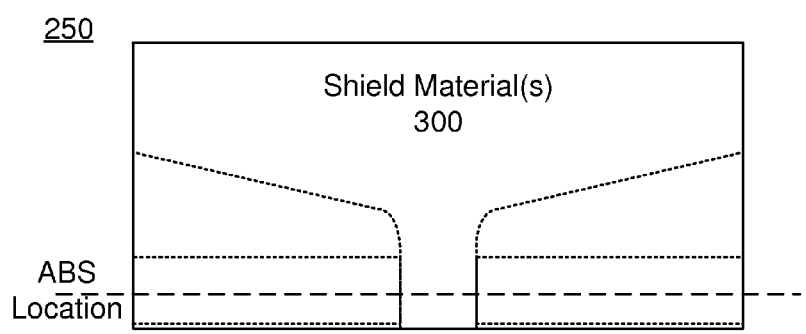

The half shield(s) may be provided, via step 176. Step 176 includes depositing the material(s) for the half shield. For example, a magnetic material such as NiFe may be electroplated in step 176. In some embodiments, the half shield are part of a wraparound shield. Thus, step 176 may also include providing a wraparound shield. In addition, a write gap layer may also be provided. The magnetic material(s), such as NiFe, for the shield may thus be plated or otherwise deposited. FIGS. 18A, 18B, 18C and 18D depict side, ABS, recessed and plan views of the transducer 250 after step 176 has been performed. Thus, the shield 300 is shown. As can be seen in FIGS. 18B and 18C, the shield 300 includes half shield portions, which terminate on the top of the first layer 262". Also shown is gap layer 292 that may be nonmagnetic. Thus, the shield 300 extends from above the top of the main pole 290' to a region between the top and the bottom of the main pole 290'. The proximity of the bottom of the shield 300 to the bottom of the pole 290' may depend upon design considerations. In some embodiments, a wraparound shield is not desired. In such embodiments, step 176 includes removing a trailing portion of the shield. FIGS. 19A, 19B, 19C and 19D depict side, ABS, recessed and plan views of the transducer 250 after step 170 has been performed in such an embodiment. Thus, the shield 300' is a half side shield only.

Using the method 150, the transducer 250 including shield 300 or 300' may be provided. Thus, the benefits of shingle recording may be achieved. For example, higher areal density recording may be performed by a head having larger critical dimensions.

We claim:

1. A method for fabricating magnetic transducer having air-bearing surface (ABS) location comprising:
   providing an intermediate including a first sublayer and a second sublayer in at least a side shield region, the first sublayer having a first sublayer top, the second sublayer residing on the first sublayer top in the shield region;
   forming a trench in the intermediate layer using at least one etch;
   providing a main pole in the trench, the main pole having a bottom and a top wider than the bottom, the first sublayer top being between the top and the bottom of the main pole;
   removing at least a portion of the second sublayer in the shield region; and
   providing at least one half side shield, a bottom of the at least one half side shield being between the top and the bottom of the main pole.

2. The method of claim 1 wherein the first sublayer includes a first portion in the side shield region and a second portion outside of the side shield region and wherein the second sublayer resides on the first portion of the first sublayer in the side shield region, the second portion of the first sublayer being thicker than the first portion of the first sublayer such that the first sublayer top of the second portion is aligned with a second sublayer top.

3. The method of claim 2 wherein the step of providing the intermediate layer further includes:
   full-film depositing a first nonmagnetic layer;
   full-film depositing a second nonmagnetic layer on the first nonmagnetic layer;
   removing a portion of the first nonmagnetic layer and a portion of the second nonmagnetic layer outside of the side shield region, a remaining portion of the first nonmagnetic layer corresponding to the first portion of the first sublayer, a remaining portion of the second nonmagnetic layer corresponding to the second sublayer;
   refilling a region outside of the side shield region with a third nonmagnetic layer; and
   planarizing at least the third nonmagnetic layer, a remaining portion of the third nonmagnetic layer forming the second portion of the first sublayer.

4. The method of claim 3 wherein the first nonmagnetic layer and the third nonmagnetic layer include silicon oxide and the second nonmagnetic layer includes aluminum oxide.

5. The method of claim 1 wherein the at least one etch removes a portion of the first sublayer and an additional portion of the second sublayer.

6. The method of claim 1 wherein the step of providing the main pole further includes:
   depositing a seed layer, a portion of the seed layer residing in the trench;
   depositing at least one magnetic pole material; and
   planarizing the at least one magnetic pole material.

7. The method of claim 6 wherein step of removing the at least the portion of the second sublayer further includes:
   wet etching the second sublayer using an etchant, the seed layer being resistant to the etchant.

8. The method of claim 6 wherein a portion of the seed layer forms at least a portion of a side gap between the main pole and the at least one half side shield.

9. The method of claim 1 further comprising:
providing a write gap on the main pole; and
providing a trailing shield.

10. The method of claim 1 wherein the step of providing the at least one half side shield further includes:
forming a wraparound shield including the at least one half side shield and
a trialing shield.

11. A method for fabricating magnetic transducer having air-bearing surface (ABS) location comprising:
full-film depositing a first nonmagnetic layer, the first nonmagnetic layer consisting of silicon oxide;
full-film depositing a second nonmagnetic layer on the first nonmagnetic layer, the second nonmagnetic layer consisting of aluminum oxide;
providing a mask on the second nonmagnetic layer, the mask covering at least a shield region;
removing a portion of the first nonmagnetic layer and a portion of the second nonmagnetic layer outside of the side shield region, a remaining portion of the first nonmagnetic layer corresponding to a first portion of a first sublayer of an intermediate layer, a remaining portion of the second nonmagnetic layer corresponding to a second sublayer of the intermediate layer;
refilling a region outside of the side shield region with a third nonmagnetic layer, the third nonmagnetic layer consisting of silicon oxide;
planarizing at least the third nonmagnetic layer, a remaining portion of the third nonmagnetic layer forming a second portion of the first sublayer, the second portion of the first sublayer being thicker than the first portion of the first sublayer such that the first sublayer top of the second portion is aligned with a second sublayer top of the second sublayer, the first sublayer and the second sublayer forming the intermediate layer;
forming a trench in the intermediate layer using at least one etch, the trench having a location and a profile corresponding to at least a portion of a main pole;
depositing a seed layer, a portion of the seed layer residing in the trench;
depositing at least one magnetic pole material;
planarizing the at least one magnetic pole material for the main pole;
wet etching at least a portion of the second sublayer using an etchant, the seed layer being resistant to the etchant, the etchant removing the at least the portion of the second sublayer in the shield region; and
providing at least one half side shield, a bottom of the at least one half side shield being between the top and the bottom of the main pole, the bottom of the at least one half side shield residing on top of the first sublayer.

12. A magnetic recording transducer having air-bearing surface (ABS) location and an intermediate layer comprising:
an intermediate layer having a first sublayer;
main pole having a bottom and a top wider than the bottom, the main pole having a pole tip region and a yoke region, the bottom of the main pole in the pole tip region forming a leading bevel, the second sublayer of the intermediate layer residing under the leading bevel;
a nonmagnetic side gap;
at least one half side shield, a bottom of the at least one half side shield being between the top and the bottom of the main pole, the nonmagnetic side gap being between the main pole and the at least one half side shield.

13. The magnetic recording transducer of claim 12 wherein the bottom of the main pole is on a top of a portion of the first sublayer.

14. The magnetic recording transducer of claim 12 further comprising:
a write gap; and
a trailing shield, the write gap being between the top of the main pole and
at least a portion of the trailing shield.

15. The magnetic recording transducer of claim 14 wherein the trailing shield is magnetically coupled with the at least one half side shield such that the trailing shield and the at least one half side shield form a wraparound shield.

16. The magnetic transducer of claim 12 wherein the main pole has a plurality of sidewalls forming an angle with a down track direction, the angle being at least three degrees and not more than fifteen degrees at the ABS.

17. The magnetic transducer claim 16 wherein the angle is at least six degrees and not more than nine degrees.

18. The magnetic transducer of claim 16 wherein the angle decreases with distance from the ABS.

* * * * *